(12) United States Patent
Gosain

(10) Patent No.: US 9,157,233 B2
(45) Date of Patent: Oct. 13, 2015

(54) SYSTEM FOR FORMING AN INSULATED CONCRETE THERMAL MASS WALL

(75) Inventor: Sanjiv Gosain, Palmerston (AU)

(73) Assignee: Ambe Engineering Pty Ltd, Gungahlin (AU)

( * ) Notice: Subject to any disclaimer, the term of this patent is extended or adjusted under 35 U.S.C. 154(b) by 64 days.

(21) Appl. No.: 13/643,684

(22) PCT Filed: Apr. 27, 2011

(86) PCT No.: PCT/AU2011/000477
§ 371 (c)(1),
(2), (4) Date: Oct. 26, 2012

(87) PCT Pub. No.: WO2011/134008
PCT Pub. Date: Nov. 3, 2011

(65) Prior Publication Data
US 2013/0036688 A1    Feb. 14, 2013

(30) Foreign Application Priority Data

Apr. 30, 2010   (AU) ................................ 2010901868

(51) Int. Cl.
*E04B 2/86*     (2006.01)
*E06B 1/02*     (2006.01)

(52) U.S. Cl.
CPC ............ *E04B 2/8647* (2013.01); *E04B 2/8641* (2013.01); *E04B 2/8652* (2013.01); *E06B 1/02* (2013.01); *E04B 2002/867* (2013.01)

(58) Field of Classification Search
CPC ... E04B 2/8647; E04B 2/8641; E04B 2/8652; E04B 2002/867; E06B 1/02
USPC ............ 52/220.1, 220.2, 220.3, 405.1, 405.4, 52/407.1, 404.2, 309.4, 309.17, 647, 677, 52/426
See application file for complete search history.

(56) References Cited

U.S. PATENT DOCUMENTS

| | | | | |
|---|---|---|---|---|
| 2,316,819 | A * | 4/1943 | Tedrow | 52/564 |
| 3,676,967 | A | 7/1972 | Frati | |
| 4,566,238 | A | 1/1986 | Janopaul | |
| 4,885,888 | A * | 12/1989 | Young | 52/426 |
| 4,889,310 | A * | 12/1989 | Boeshart | 249/41 |
| 5,735,093 | A * | 4/1998 | Grutsch | 52/309.11 |
| 5,809,728 | A * | 9/1998 | Tremelling | 52/426 |
| 6,079,176 | A * | 6/2000 | Westra et al. | 52/404.2 |
| 6,148,576 | A * | 11/2000 | Janopaul, Jr. | 52/426 |
| 6,401,419 | B1 * | 6/2002 | Beliveau | 52/592.6 |

(Continued)

FOREIGN PATENT DOCUMENTS

| | | |
|---|---|---|
| CN | 86 1 03800 A | 11/1987 |
| DE | 19654827 | 6/1998 |

(Continued)

*Primary Examiner* — James Ference
(74) *Attorney, Agent, or Firm* — McDonnell Boehnen Hulbert & Berghoff LLP

(57) ABSTRACT

Disclosed herein is an insulated thermal mass concrete wall (100) constructed using a system (10). The system (10) comprises an outer insulation layer (12) and an inner drywall layer (14) spaced apart from the outer insulation layer. Vertical frame members, formed from several frame member modules (16) that are connected one on top of another, extend between the outer insulation layer (12) and the inner drywall layer (14) to interlock the insulation and drywall layers and maintain a space there between for receiving uncured concrete (18), in which conduits (19) for services can be embedded.

23 Claims, 36 Drawing Sheets

(56) References Cited

U.S. PATENT DOCUMENTS

| | | | |
|---|---|---|---|
| 6,536,172 B1* | 3/2003 | Amend | 52/426 |
| 6,609,340 B2* | 8/2003 | Moore et al. | 52/309.11 |
| 6,622,452 B2 | 9/2003 | Alvaro | |
| 6,668,503 B2* | 12/2003 | Beliveau | 52/426 |
| 6,792,729 B2* | 9/2004 | Beliveau | 52/426 |
| 6,820,384 B1* | 11/2004 | Pfeiffer | 52/426 |
| 6,931,806 B2* | 8/2005 | Olsen | 52/309.11 |
| 6,935,081 B2* | 8/2005 | Dunn et al. | 52/426 |
| 6,978,581 B1* | 12/2005 | Spakousky | 52/405.4 |
| 7,024,833 B1* | 4/2006 | Rice | 52/426 |
| 7,032,357 B2* | 4/2006 | Cooper et al. | 52/426 |
| 7,082,731 B2* | 8/2006 | Patz et al. | 52/426 |
| 7,082,732 B2* | 8/2006 | Titishov | 52/426 |
| 7,415,804 B2* | 8/2008 | Coombs et al. | 52/426 |
| 7,827,752 B2* | 11/2010 | Scherrer | 52/426 |
| 8,161,699 B2* | 4/2012 | LeBlang | 52/309.12 |
| 8,348,224 B2* | 1/2013 | McDonagh | 249/216 |
| 2001/0027630 A1* | 10/2001 | Moore et al. | 52/741.13 |
| 2001/0032431 A1* | 10/2001 | Grinhpun et al. | 52/309.12 |
| 2002/0124508 A1 | 9/2002 | Dunn et al. | |
| 2003/0097806 A1* | 5/2003 | Brown | 52/220.1 |
| 2004/0035073 A1* | 2/2004 | Bravinski | 52/426 |
| 2004/0055237 A1* | 3/2004 | Bravinski | 52/426 |
| 2005/0028466 A1* | 2/2005 | Titishov | 52/474 |
| 2005/0028467 A1* | 2/2005 | Bentley | 52/474 |
| 2005/0108985 A1* | 5/2005 | Bravinski | 52/782.1 |
| 2005/0120659 A1* | 6/2005 | Nickerson | 52/506.01 |
| 2006/0117690 A1* | 6/2006 | Garrett | 52/309.11 |
| 2007/0193166 A1 | 8/2007 | Ryan | |
| 2008/0022619 A1 | 1/2008 | Scherrer | |
| 2008/0104911 A1* | 5/2008 | Jarvie et al. | 52/309.1 |
| 2008/0271401 A1* | 11/2008 | Grypeos | 52/426 |
| 2008/0302045 A1* | 12/2008 | Roach | 52/426 |
| 2009/0120027 A1* | 5/2009 | Amend | 52/426 |
| 2009/0308011 A1* | 12/2009 | Philippe | 52/426 |
| 2010/0251651 A1* | 10/2010 | Mahe et al. | 52/426 |
| 2012/0023851 A1* | 2/2012 | Marshall et al. | 52/426 |

FOREIGN PATENT DOCUMENTS

| | | |
|---|---|---|
| JP | 8312121 | 11/1996 |
| WO | 9516835 | 6/1995 |

* cited by examiner

SYSTEM FOR FORMING AN INSULATED CONCRETE THERMAL MASS WALL

This application is a US national phase of International Application No. PCT/AU2011/000477 filed on Apr. 27, 2011, which claims the benefit of Australian patent application 2010901868, filed Apr. 30, 2010, the disclosures of which are incorporated herein by reference in their entirety.

This application claims priority from Australian Provisional Patent Application No. 2010901868, the entire disclosure of which is incorporated herein by way of reference.

The present disclosure relates to a system for forming an insulated concrete thermal mass wall. The system has been developed primarily for use in forming walls for residential, commercial and industrial buildings, but it will be appreciated that it may also be used for forming walls in specialized buildings such as data centres and cold storages, and also for forming basements, retaining walls, thermal and sound barriers, etc.

Thermal mass is a property that enables building materials to absorb, store and later slowly release the stored heat. An insulated thermal mass wall acts like a thermal battery. In order to derive maximum benefit, the thermal mass should be placed on the inside of the insulation.

In winter, a building with an insulated thermal mass wall absorbs and stores thermal energy from sunlight entering through open windows during the day, and from other direct and indirect sources, and slowly releases the stored thermal energy at night to keep the house warm. In summer, the thermal mass wall is cooled by relatively cooler conditions within the building during the day, with thermal energy stored in the wall being slowly released outside the building at night through convection and through open windows. In summer, the exterior insulation inhibits thermal energy outside the building from entering the building or accumulating in the thermal mass wall. Drawing the curtains on windows in summer also inhibits sunlight from entering the building and thereby inhibits thermal energy from sunlight accumulating in the thermal mass walls.

One of the most important benefits of an insulated thermal mass wall is its ability to moderate temperature extremes, which helps to create an internal environment that is more comfortable to live in. The surface temperature of insulated concrete thermal mass walls also tends to be more stable, which makes condensation less likely to occur.

A common high thermal mass material used in building construction is concrete. It is readily available, relatively inexpensive and can provide structurally strong buildings with wind resistance, weather proofing, moisture protection, air leakage resistance, sound resistance, fire resistance, termite resistance and earthquake resistance, while still maintaining a healthy indoor air quality.

Solar passive design of buildings may require the thermal mass to be exposed to the interiors of the building in areas with good solar orientation and direct solar access and may also require that the thermal mass is not directly exposed to the interiors of the building in areas with poor solar orientation or no solar access in order to promote overall moderation and comfort.

Capturing free energy from the sun means that insulated thermal mass buildings are more energy passive which can result in significantly lower heating and cooling costs.

Most present systems of forming insulated concrete walls generally use stay in place insulating concrete forms or conventional removable formwork, both of which suffer from severe drawbacks and may not always be appropriate for meeting the objectives of modern energy conservation practices.

Insulating concrete forms generally consist of two layers of polystyrene insulation panels which are held together by plastic or metal ties and are stacked one on top of the other, like block work, to form a cavity into which uncured concrete is poured to form a insulated concrete wall.

A known problem with insulating concrete forms is that, because the insulation panels define the form, the insulation must be provided on both sides of the concrete whether desired or not. Accordingly, with this conventional method, it is not possible to form the concrete wall with only exterior/outside insulation.

A significant disadvantage of insulating a concrete wall from both sides is that the inside insulation tends to inhibit the thermal mass effect of the concrete wall. That is, the inside insulation inhibits the desired transfer of thermal energy between the wall and the interior of a building, as described above.

There are several known formwork systems which use a removable inside form made from plastic, aluminium or steel formwork to form a concrete wall with only exterior/outside insulation. However, all these known systems involve extensive site labour to initially set up the formwork and also to later on strip, remove, wash and store the inside formwork. Accordingly, these formwork systems are very uneconomical to use.

Another known drawback of present systems is that they require an additional drywall layer to be attached to the inside of the thermal mass wall, which makes the entire process very labour intensive and expensive to use.

Another known drawback of present systems is that they do not have a services cavity and often rely upon manual chasing the inside walls for installation of electrical, plumbing and other services.

Another known drawback of present systems is that they often require unique and custom moulded polystyrene insulation panels and do not easily allow for pre-meshed, pre-rendered, pre-laminated or other standard insulating panels to be used for achieving economical exterior finishes.

Another known drawback of present systems is that they are fully closed, which makes it very difficult to visually place, inspect and certify reinforcement bars prior to pouring of concrete to form the wall.

Another major drawback of present systems is that they often do not incorporate an integral window and/or door sub-frame to enable easy attachment and sealing of various types of commercially available windows and doors to prevent water and air infiltration into the building. Present systems are also not flexible enough to allow the forming of internal walls without any insulation.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

A first aspect of the present disclosure provides a system for forming an insulated thermal mass concrete wall, said system comprising:

an outer insulation layer;
an inner drywall layer spaced apart from the outer insulation layer;
frame members extending between the outer insulation layer and the inner drywall layer to interlock the insulation and drywall layers and maintain a space therebetween for receiving uncured concrete and/or conduits for services.

Each of the frame members may comprise a pair of elongate, spaced apart, substantially parallel, studs and a plurality of spacers interconnecting the pair of studs. The studs may comprise outer studs for connection to the outer insulation layer and inner studs for connection to the inner drywall layer. The outer studs may extend generally parallel to a plane of the outer layer and the inner studs may extend generally parallel to a plane of the inner layer. The connection between the spacers and some of the studs may be a welded connection. The connection between the spacers and some of the studs may be a mechanical connection. The studs may be pre-fabricated with connecting formations at predetermined intervals for engagement by corresponding connecting formations on the spacers to mechanically interconnect the spacers and studs.

The spacers may comprise at least one slot for positioning reinforcement for concrete to be poured between the inner and outer layers. A plurality of the slots may be provided. The slots may be of different lengths and may be provided at different axial positions to facilitate a tailored arrangement of the reinforcement. The spacers may be formed from fire-rated steel.

The outer studs may each comprise an outer flange extending substantially parallel to a plane of the outer layer. The outer insulation layer may include slots for slidably receiving the flanges of the studs, such that engagement of the flanges in the slots secures the outer insulation layer to the outer studs against relative movement in a direction perpendicular to a plane of the outer insulation layer. Alternatively, the outer layer may be connected directly to the outer flange using suitable adhesives and/or fasteners, such as screws, bolts, staples, or the like.

The inner studs may each comprise an inner flange extending substantially parallel to a plane of the inner layer. The inner flange may comprise a services cavity. The inner layer may be connected directly to the inner flange using suitable adhesives and/or fasteners, such as screws, bolts, staples, or the like. Alternatively, the inner flange may be slidably engageable in an elongate track member. The track member may have a first substantially C-shaped channel in which the inner flange is slidably engageable. The track member may comprise a flat mounting surface for facilitating joining of drywall sheets to form the inner layer. The flat surface may comprise a central straight linear groove to facilitate alignment of drywall sheets to form the inner layer. The track member may comprise a second substantially C-shaped channel, on a side of the first C-shaped channel remote from the inner layer, to provide additional strength and rigidity and which may be used to secure any retaining clips or fittings for in-situ casting into the concrete wall. Each of the frame members may be formed from a plurality of frame member modules that are joined together to form a unitary frame member. The studs and spacers of each frame member module may be integrally formed in one-piece construction, for example by injection moulding, structural foam moulding, gas assist moulding or a combination of extrusion and machining. The track member may have a length greater than that of the frame member modules, such that engagement of a plurality of the frame member modules in the track member secures the inner end of the frame member modules together. The outer insulation layer may have a length greater than that of the frame member modules, such that engagement of a plurality of the frame member modules with the outer insulation layer secures the outer end of the frame member modules together.

The outer and/or inner studs may comprise apertures therein for facilitating distribution of uncured concrete around the frame members.

A cavity-forming flange may be connected relative to the inner flange, may extend parallel to the inner flange and may be spaced apart from the inner flange to form a cavity therebetween. A lining layer may be connected to the cavity forming flange. The lining layer may be non-structural. The cavity forming flange may define a flat mounting surface for facilitating joining of the lining layer. The flat surface of the cavity forming flange may comprise a central straight linear groove to facilitate alignment of sheets to form the lining layer.

The portion of the system on the inner drywall layer side of the frame members may be free from thermal insulation, so as to facilitate thermal energy transfer on this side of the system.

The outer insulation layer may be formed from a thick sheet or panel based foam insulation product, such as extruded or expanded polystyrene foam panels, phenolic foam panels, polyurethane foam panels, polysulfone foam panels, or the like, depending upon the desired performance criteria for the particular application and climate. The sheets in the outer layer may provided with tongue and groove formations.

In a second aspect, there is provided a frame member for an insulated thermal mass concrete wall, said frame member comprising:

an outer stud adapted to have an outer insulation layer affixed thereto;
an inner stud adapted to have an inner drywall layer affixed thereto;
a plurality of spacers extending between the outer stud and the inner stud to interlock the outer and inner studs together in a spaced apart relationship,
wherein an opening is defined between the spacers and the outer and inner studs, with the opening being sized to permit flow of uncured concrete therethrough if the uncured concrete is poured between an outer insulation later affixed to the outer studs and an inner drywall layer affixed to the inner studs.

The connection between the spacers and some of the studs may be a welded connection. The connection between the spacers and some of the studs may be a mechanical connection. The studs may be pre-fabricated with connecting formations at predetermined intervals for engagement by corresponding connecting formations on the spacers to mechanically interconnect the spacers and studs.

The spacers may comprise at least one slot for positioning reinforcement for concrete to be poured between the inner and outer layers. A plurality of the slots may be provided. The slots may be of different lengths and may be provided at different axial positions to facilitate a tailored arrangement of the reinforcement.

The outer studs may each comprise an outer flange extending substantially transverse to a length of the spacers. The inner studs may each comprise an inner flange extending substantially transverse to a length of the spacers. The inner flange may be slidingly engageable in an elongate track member. The track member may have a first substantially C-shaped channel in which the inner flange is slidably engageable. The track member may comprise a flat mounting surface for facilitating connection of drywall sheets thereto. The flat surface may comprise a central straight linear groove to facilitate alignment of drywall sheets. The track member may comprise a second substantially C-shaped channel, on a side of the first C-shaped channel proximal to the outer stud, to provide additional strength and rigidity and which may be used to secure any retaining clips or fittings for in-situ casting into a concrete wall. The inner flange may comprise a services cavity.

The frame member may comprise a plurality of frame member modules that are joined together to form a unitary frame member. The studs and spacers of each frame member module may be integrally formed in one-piece construction, for example by injection moulding, structural foam moulding, gas assist moulding or a combination of extrusion and machining. The track member may have a length greater than that of the frame member modules, such that engagement of a plurality of the frame member modules in the track member secures the inner end of the frame member modules together.

The outer and/or inner studs may comprise apertures therein for facilitating distribution of uncured concrete around the frame members.

A cavity-forming flange may be connected relative to the inner flange, may extend parallel to the inner flange and may be spaced apart from the inner flange to form a cavity therebetween. The cavity forming flange may be adapted to have a lining layer affixed thereto. The lining layer may be non-structural. The cavity forming flange may define a flat mounting surface for facilitating joining of a lining layer thereto. The flat surface of the cavity forming flange may comprise a central straight linear groove to facilitate alignment of sheets to form the lining layer.

The spacers may be formed from fire-rated steel.

Throughout this specification, the term "drywall" is to be understood as meaning any mineral-based building sheet which is strong enough to withstand the substantial forces of pouring and curing of concrete and which also accepts interior paint or rendered finishes. Examples of such sheets include, but are not limited to: fibre cement sheets, magnesium oxide sheets, and calcium oxide sheets, fibre glass reinforced composite sheets and other modern composite building sheets.

Embodiments of the presently disclosed system for forming an insulated concrete thermal mass wall will now be described, by way of example only, with reference to the accompanying drawings, in which.

Figure 1:
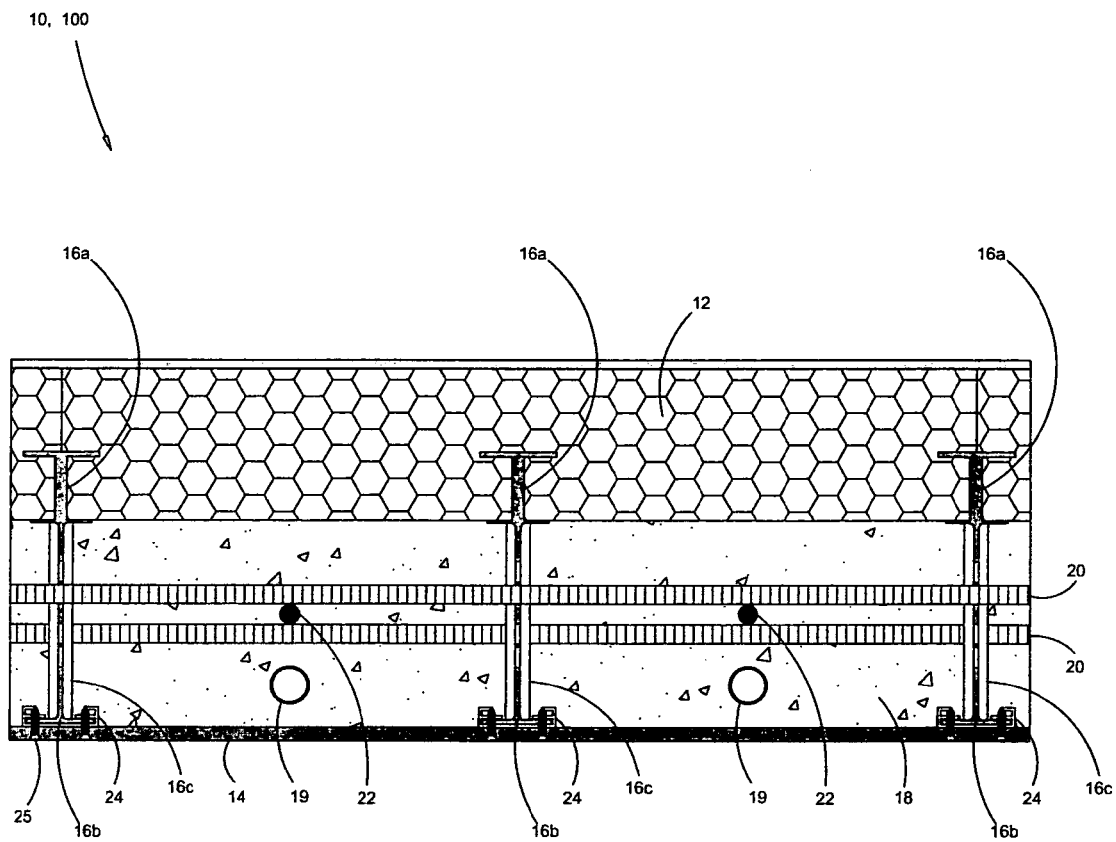
FIG. 1 is a top view of a first embodiment of an insulated concrete thermal mass wall constructed with a first embodiment of the presently disclosed system.
Figure 35:
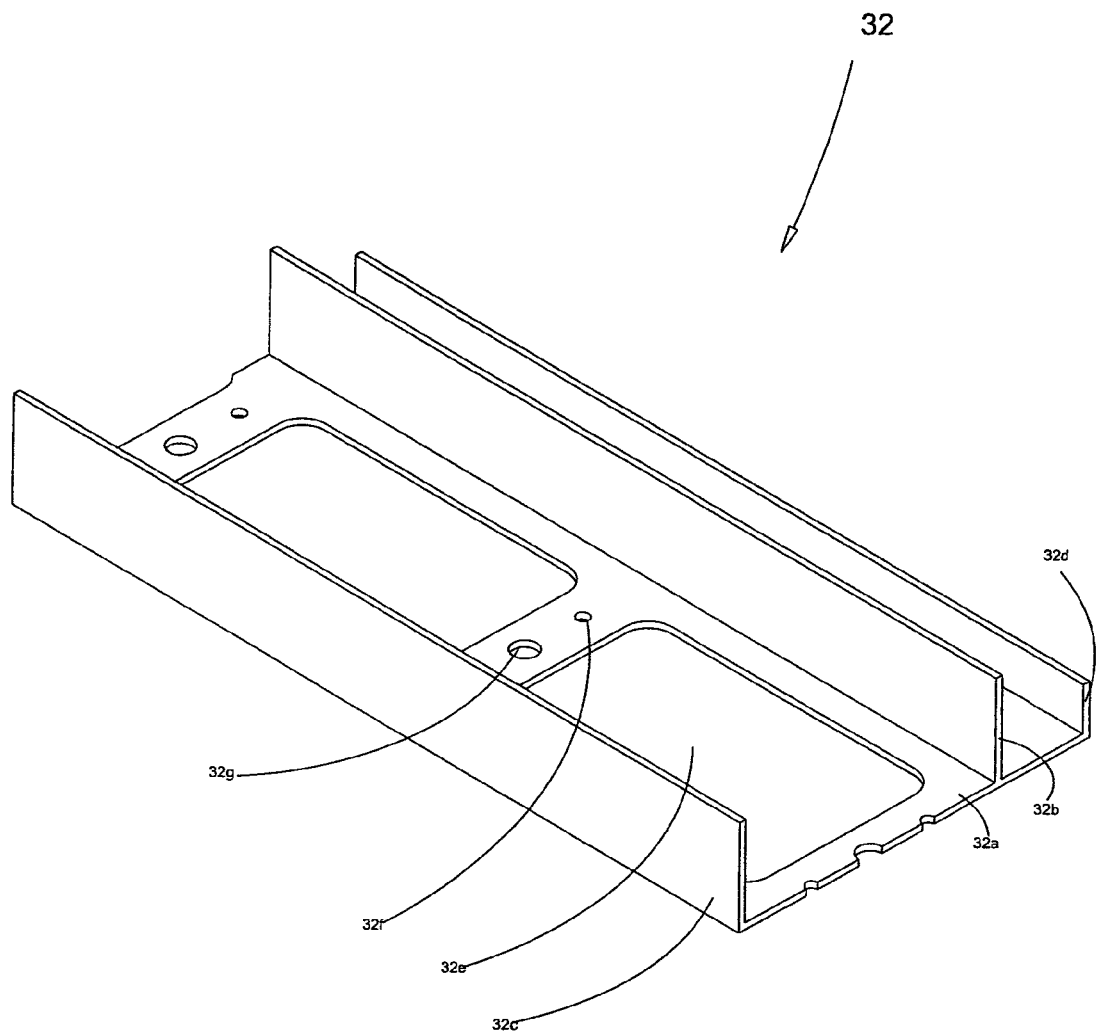
Figure 36:
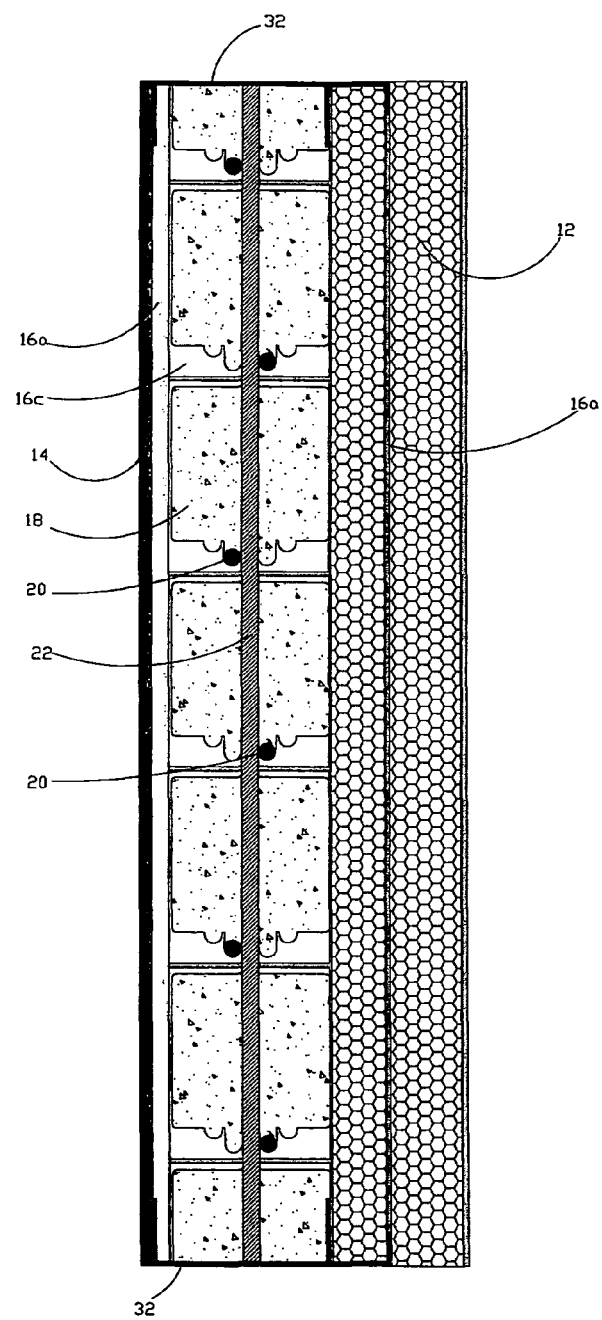

FIG. 35 is a perspective view of an integral track member for use as a bottom starting track as well as a top closing track to facilitate accurate and quick assembly of the presently disclosed insulated concrete thermal mass wall system; and FIG. 36 is a transverse sectional view through a wall assembly as shown in FIG. 1, but incorporating integral track members as shown in FIG. 35 and showing a typical insulated concrete wall assembly with a bottom starting track member and a top closing track member.

Referring to the drawings, and initially to FIG. 1, there is shown a top view of a first embodiment of an insulated thermal mass concrete wall 100 constructed using a system 10. The system 10 comprises an outer insulation layer 12 and an inner drywall layer 14 spaced apart from the outer insulation layer. Vertical frame members, formed from several frame member modules 16 that are connected one on top of another, extend between the outer insulation layer 12 and the inner drywall layer 14 to interlock the insulation and drywall layers and maintain a space therebetween for receiving uncured concrete 18, in which conduits 19 for services can be embedded.

Figure 3:
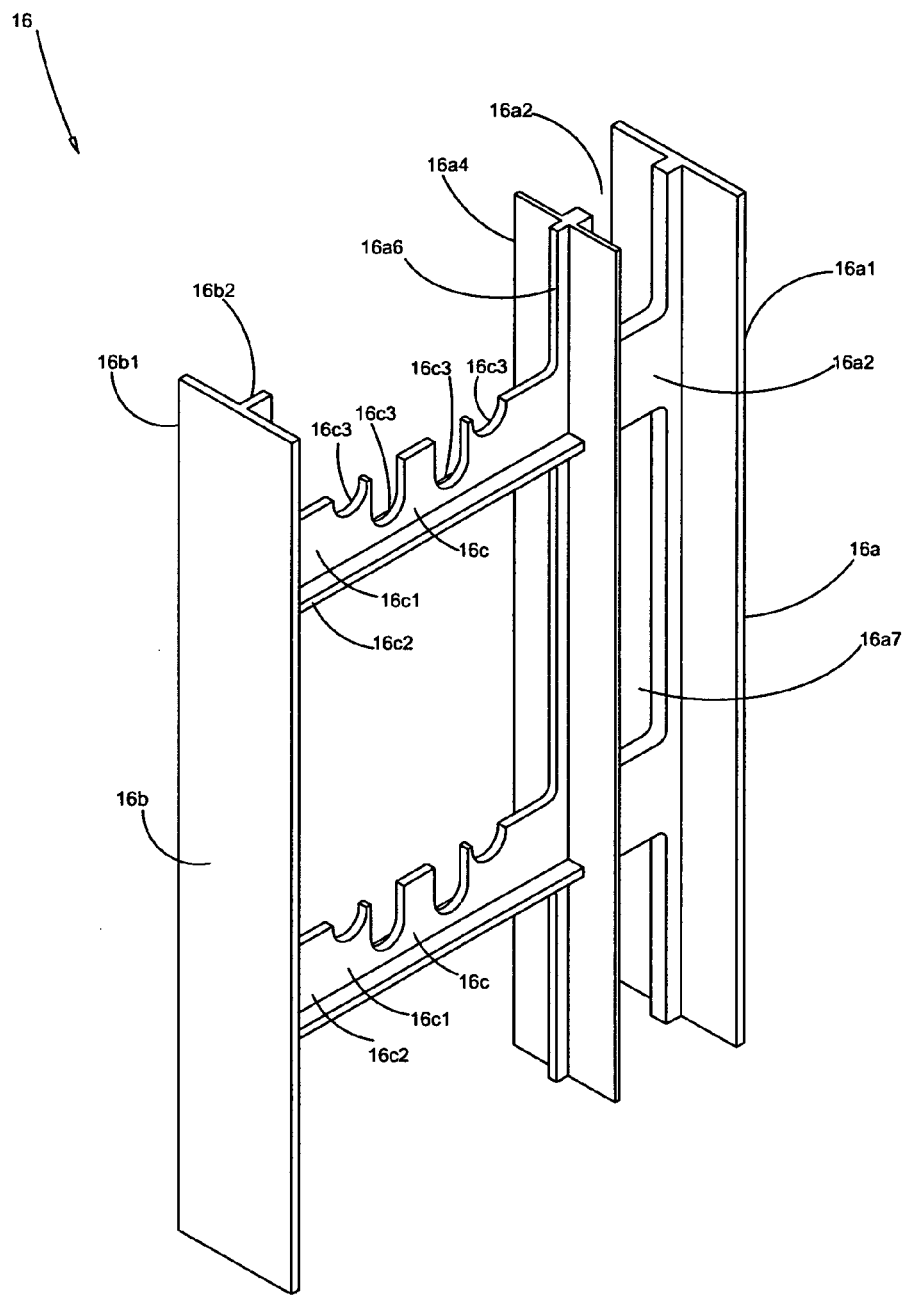
FIG. 3 is a perspective view of one module of a frame member for use in the systems of FIG. 1 and FIG. 2.

As best seen in FIG. 3, each of the frame member modules 16 comprises a pair of elongate, spaced apart, substantially parallel, studs 16a, 16b and a plurality of spacers 16c interconnecting the pair of studs. The studs comprise outer studs 16a for connection to the outer insulation layer 12 and inner studs 16b for connection to the inner drywall layer 14. The outer studs 16a extend generally parallel to a plane of the outer layer 12 and the inner studs 16b extend generally parallel to a plane of the inner layer 14.

Figure 9:
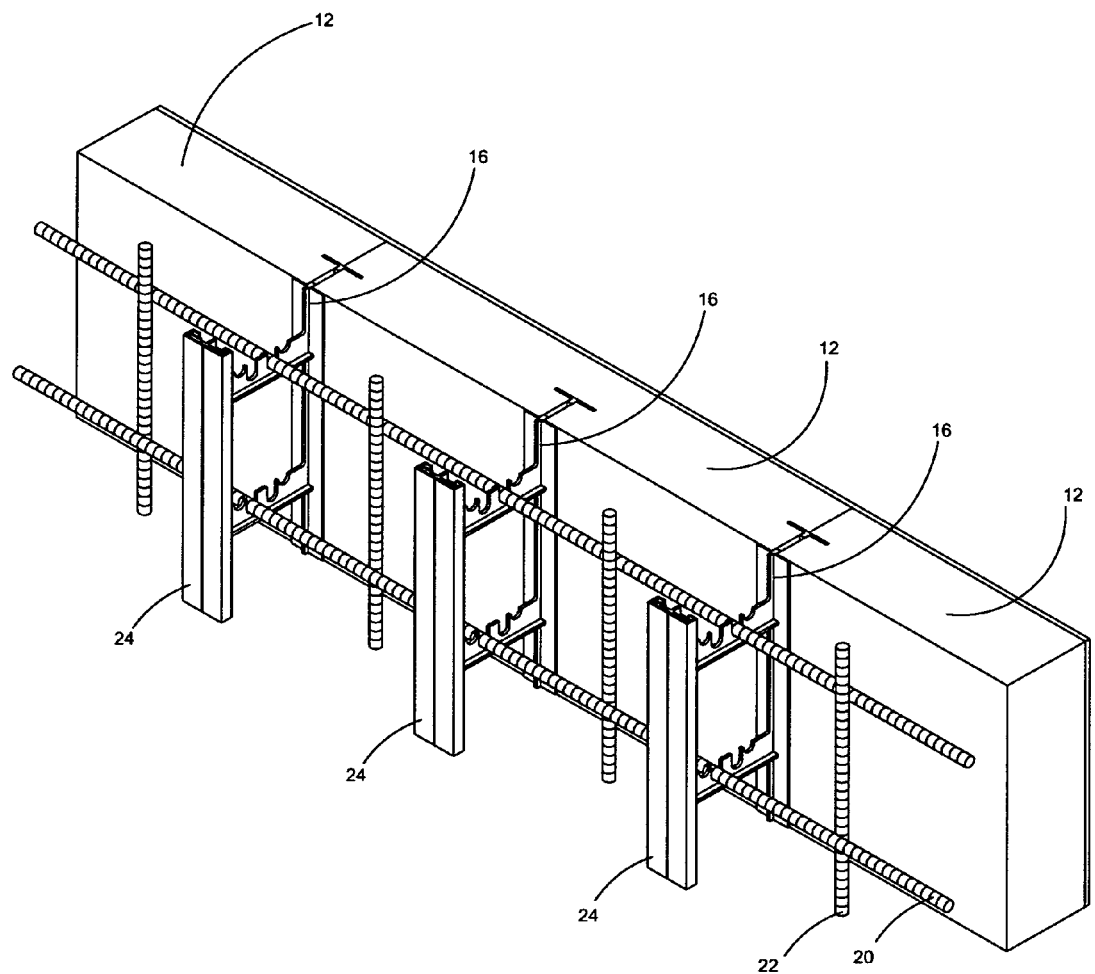
FIG. 9 is a perspective view of several modules of outer insulation panels that are interlocked and held together by the assemblies shown in FIG. 6, with reinforcement also being shown.
Figure 10:
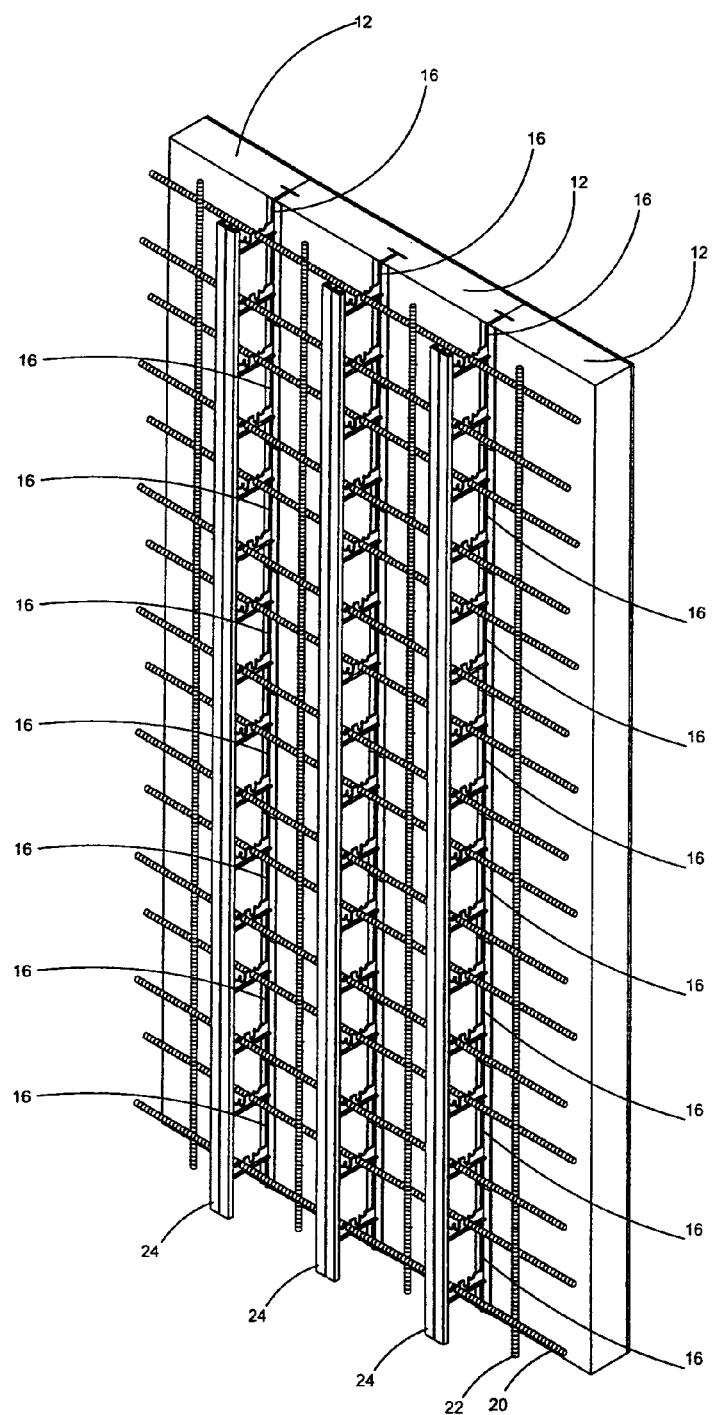
FIG. 10 is a perspective view of a full wall assembly corresponding with FIG. 9, but prior to placement of the inner layer.
Figure 11:
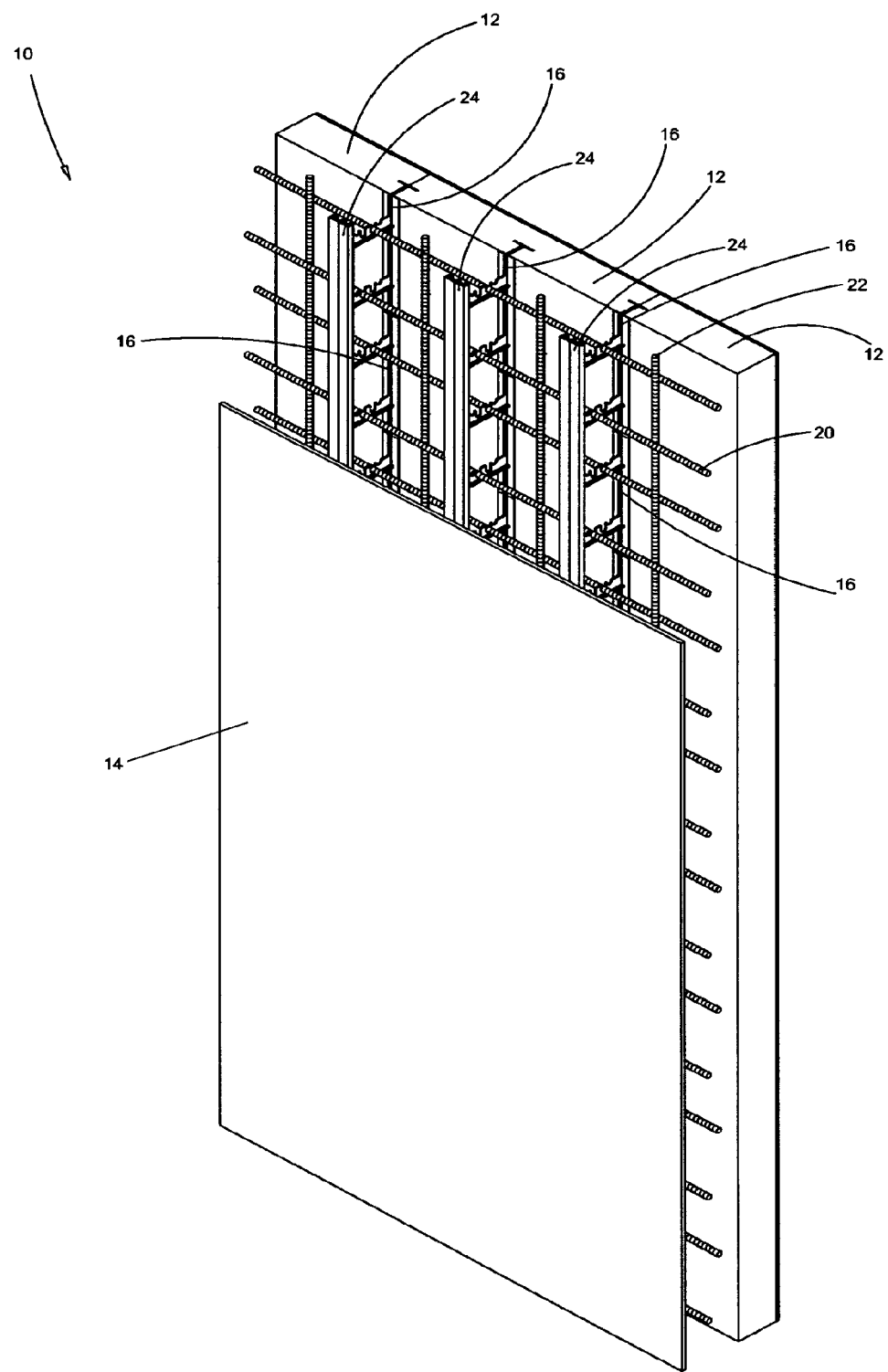
FIG. 11 is a perspective view of the full wall assembly of FIG. 10, with the inner layer now partially in place.
Figure 13:
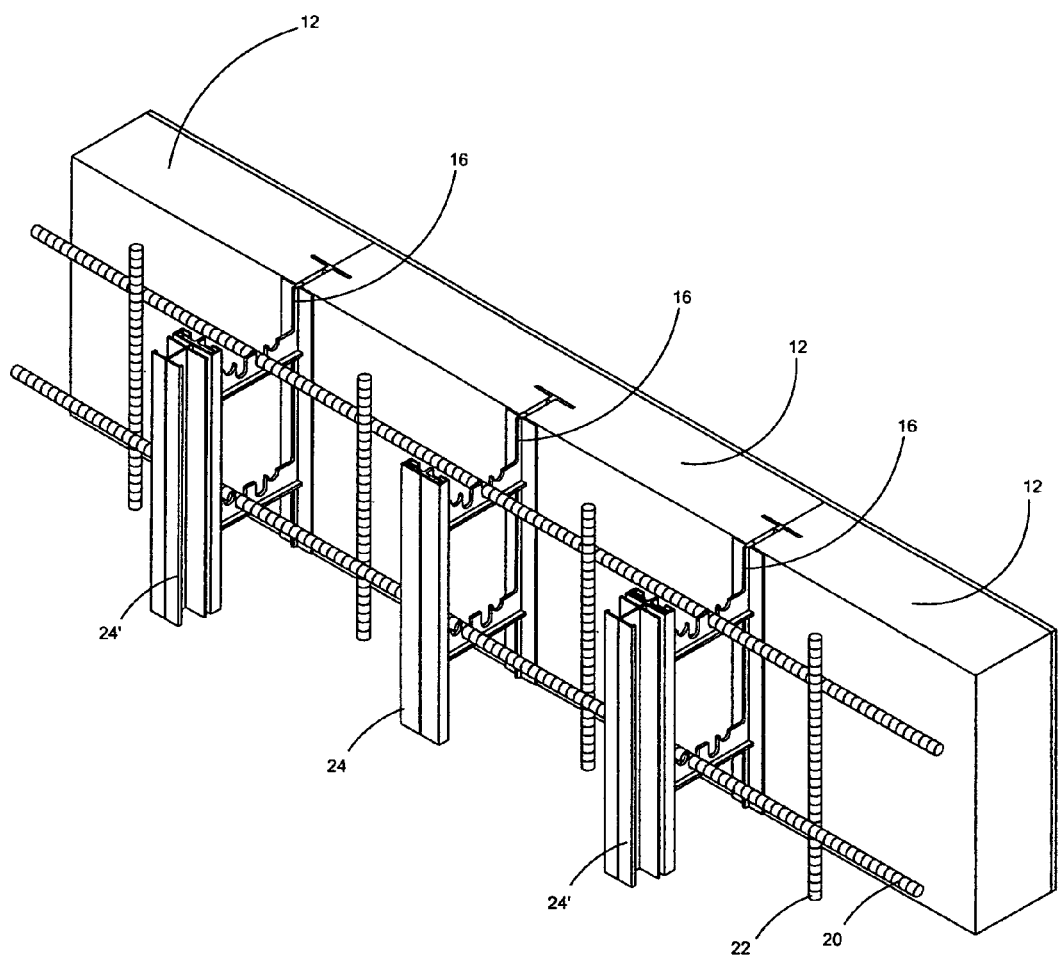
FIG. 13 is a perspective view of several modules of outer insulation panels that are interlocked and held together by assemblies as shown in FIGS. 6 and 7, with reinforcement also being shown.
Figure 14:
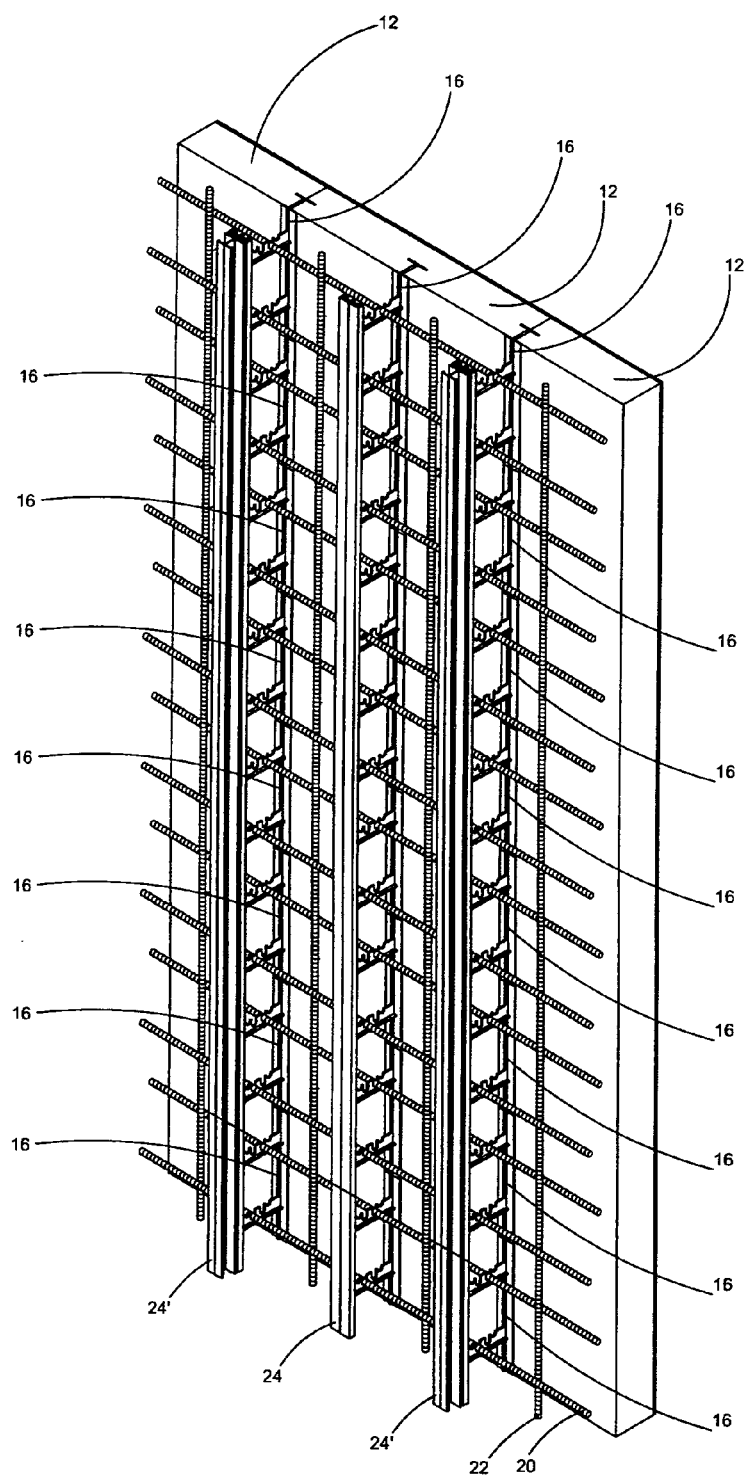
FIG. 14 is a perspective view of a full wall assembly corresponding with FIG. 13, but prior to placement of the inner layer.
Figure 15:
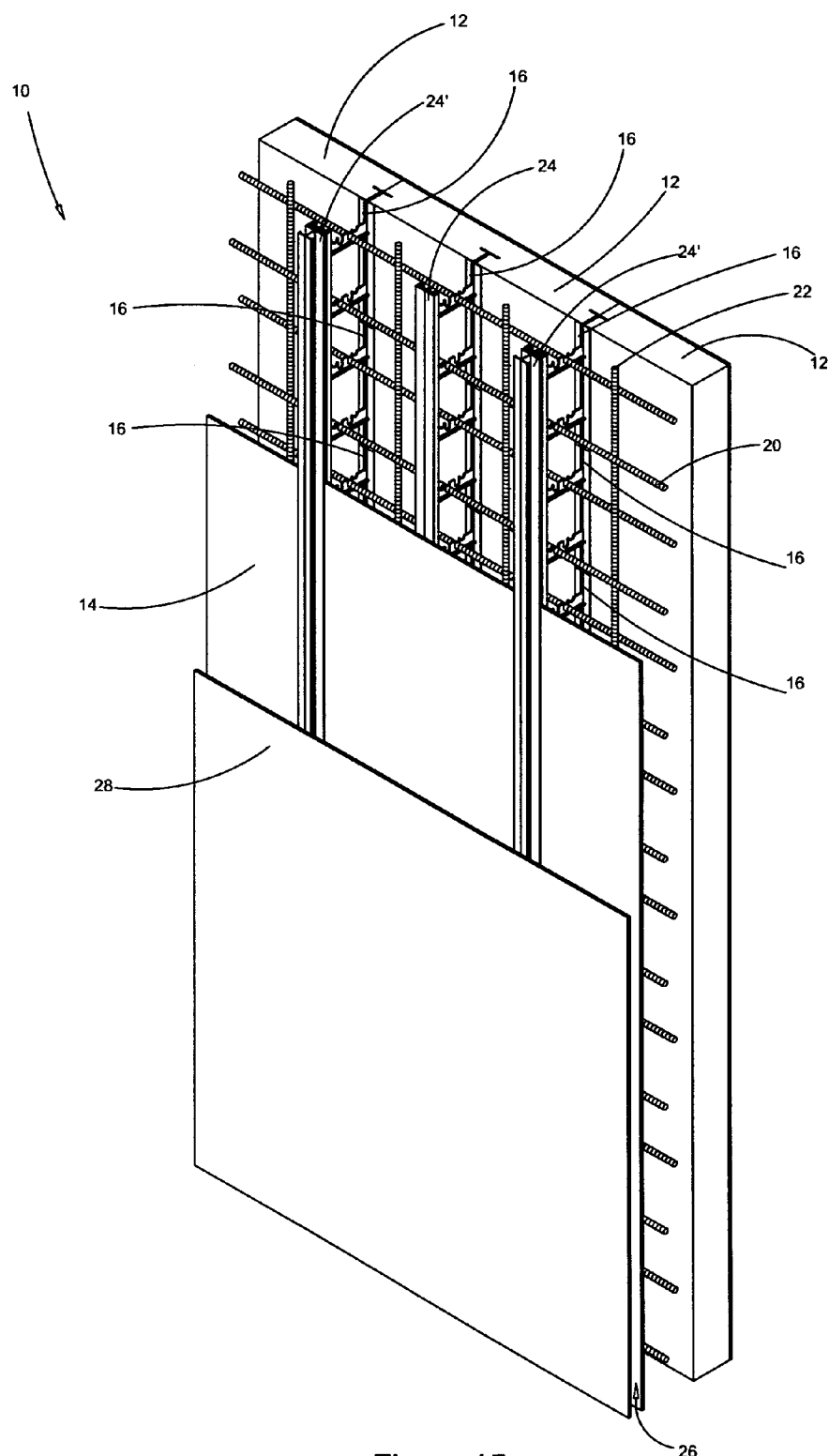
FIG. 15 is a perspective view of the full wall assembly of FIG. 14, with the inner layer now partially in place.
Figure 24:
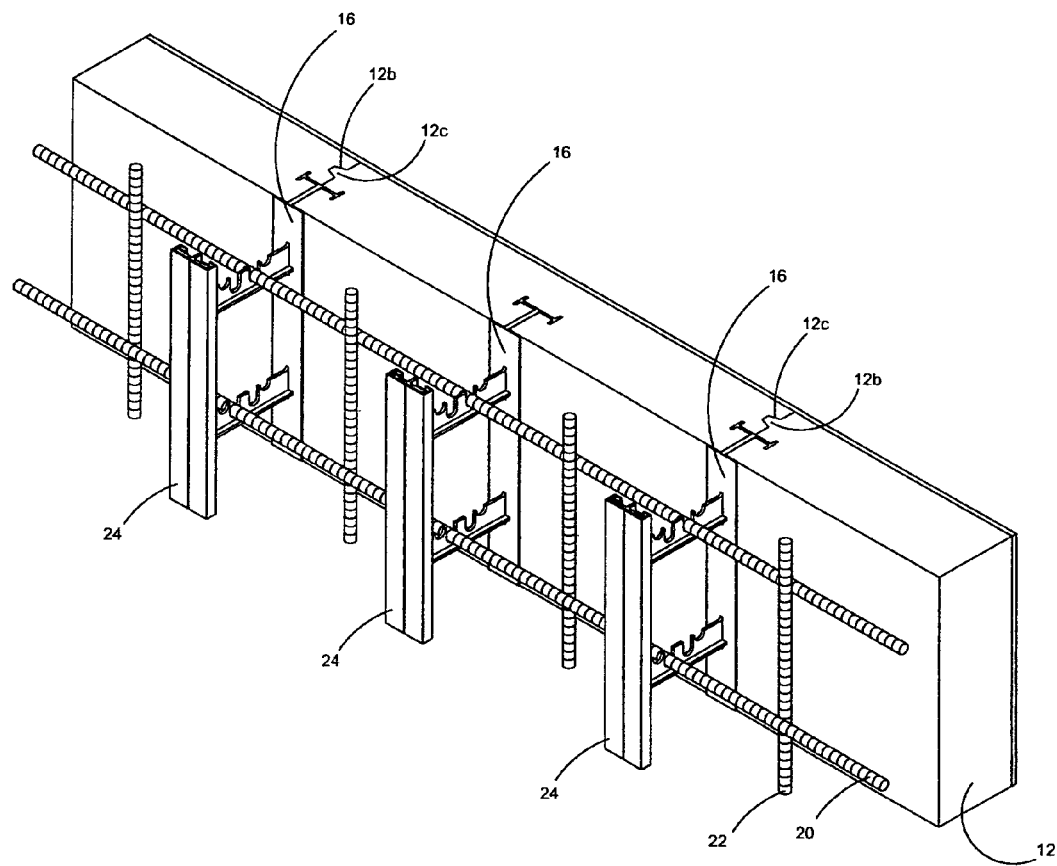
FIG. 24 is a perspective view of a partially formed wall using the frame members of FIG. 22, the insulation panels of FIG. 23 and the track members of FIG. 4.

The spacers 16c have a generally T-shaped cross-section, comprising a web 16c1 and a flange 16c2 extending normal to the web. The spacers 16c may alternatively comprise only the web 16c1 without the flange 16c2 to facilitate manufacturing using a combination of extrusion and machining processes. A plurality of slots 16c3 are formed in the web for securely positioning and supporting horizontally oriented reinforcement 20 for concrete to be poured between the inner 14 and outer 12 layers. Slots 16c3 of different lengths are provided at different axial positions to facilitate a tailored arrangement of the reinforcement 20. Vertically oriented reinforcement 22 is also provided. As best seen in FIGS. 9, 13 and 24, horizontally oriented reinforcement 20 supported by adjacent spacers 16c is typically offset about a vertical axis, to create a zigzag arrangement of the horizontally oriented reinforcement 20 from top to bottom of the wall 100, with the vertically oriented reinforcement 22 being interlaced with the zigzag arrangement of horizontally oriented reinforcement 20.

Referring again to FIG. 3, the outer studs 16a each comprise an outer flange 16a1 extending substantially parallel to a plane of the outer layer 12 and an inner flange 16a4 also extending substantially parallel to a plane of the outer layer 12. As shown, the outer flange 16a1 and the inner flange 16a4 are joined together by web 16a2. The web 16a2 may also be provided with rectangular apertures 16a7 for weight and cost reduction and to promote distribution of uncured concrete around the frame member modules 16. As shown in the embodiments of FIGS. 1 to 20, 22 to 24 and 27 to 31, the outer insulation layer 12 includes slots 12a for slidably receiving the flanges 16a1 of the outer studs, such that engagement of the flanges 16a1 in the slots 12a secures the outer insulation layer 12 to the outer studs 16a against relative movement in a direction perpendicular to a plane of the outer insulation layer 12.

Each frame member module 16 is 300 mm or 12 inches long. The length of the outer insulation layer 12, and therefore the length of the slots 12a, is greater than the length of the frame member modules 16, and typically is approximately 2400 mm or 8 feet long, such that eight frame member modules 16 are engaged in each slot 12a. Engagement of the flanges 16a1 in the slot 12a secures the outer ends of each frame member module 16 together to form a unitary frame member made up of the frame member modules 16.

Figure 21:
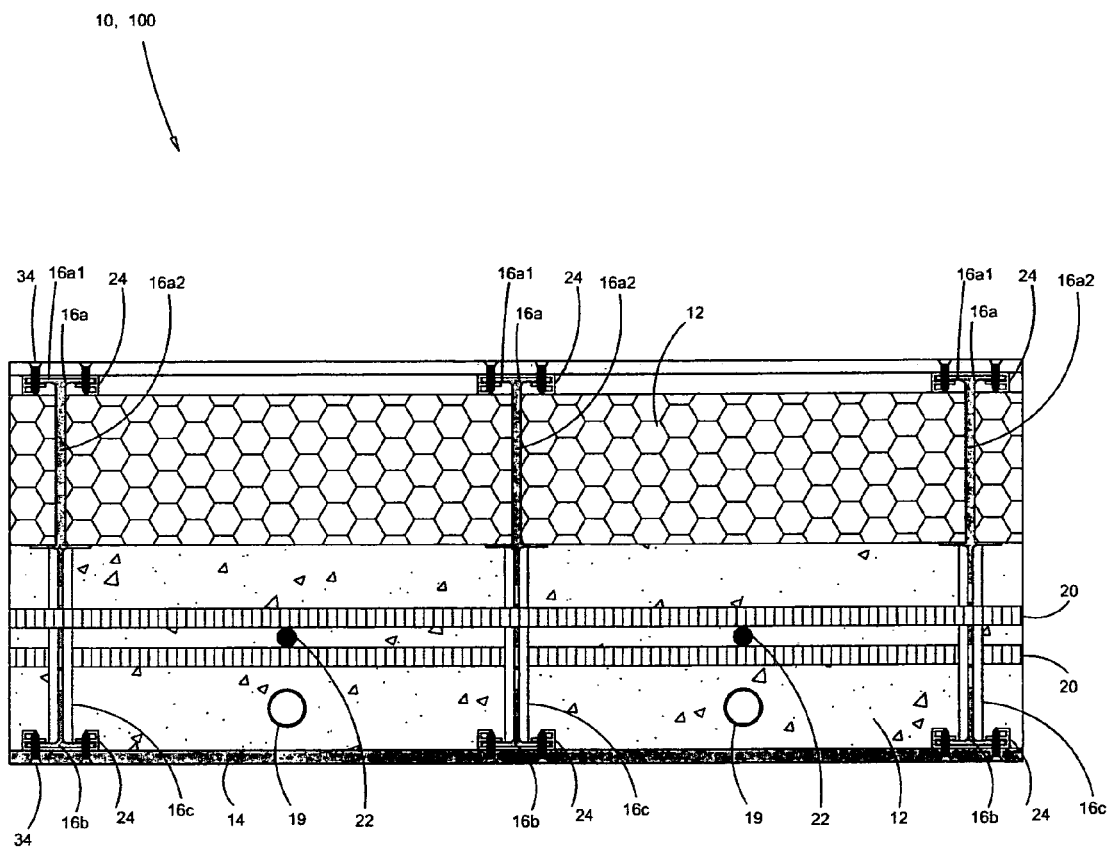
FIG. 21 is a top view of a third embodiment of an insulated concrete thermal mass wall constructed with a third embodiment of the presently disclosed system, having outer studs with flanges that extend clear of the outer insulating layer for screw fastening of various forms of external cladding or siding to the exteriors of the wall.

Alternatively, as shown in the embodiment of FIG. 21, the outer layer 12 may be connected directly to the outer flange 16a1 of each frame member module 16 through track members 24 using suitable adhesives and/or fasteners, such as screws, bolts, staples, or combinations thereof.

In either case, inner flanges 16a4 also help to further secure the outer insulation layer 12, as well as helping to prevent the entry of concrete into the slots 12a of the outer insulation layer 12.

Referring again to FIG. 3, the inner studs 16b each comprise an inner flange 16b1 extending substantially parallel to a plane of the inner layer 14. A longitudinally extending rib 16b2 projects from the inner flange 16b1 toward the outer stud 16a. A longitudinally extending rib 16a6 also projects from the outer flange 16a4 towards the inner stud 16b. The two longitudinally extended ribs 16b2 and 16a6 act in conjunction with each other to induce controlled cracking in the wall 100 at predetermined intervals.

Figure 4:
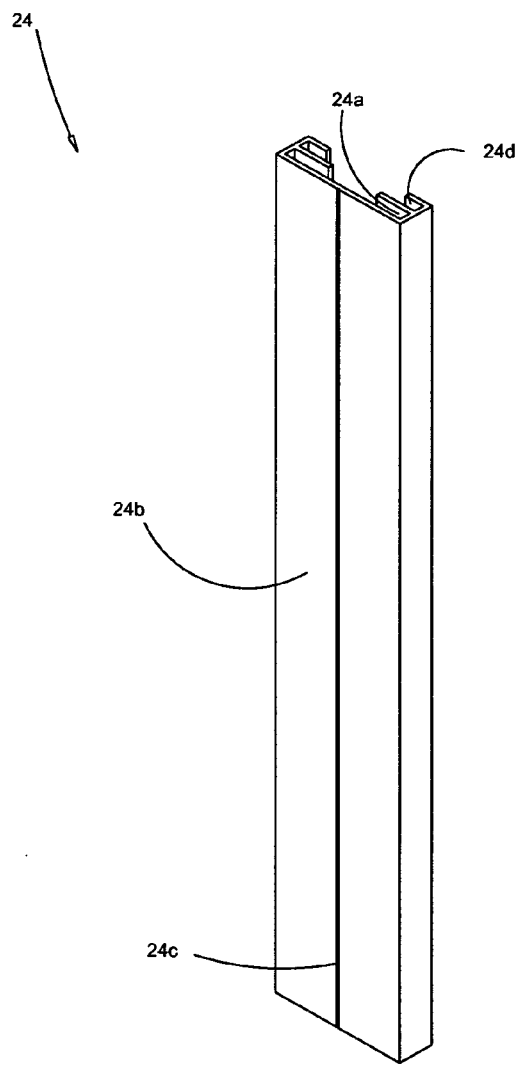
FIG. 4 is a perspective view of a first embodiment of a track member for use on an inner wall stud of the wall of FIG. 1.
Figure 5:
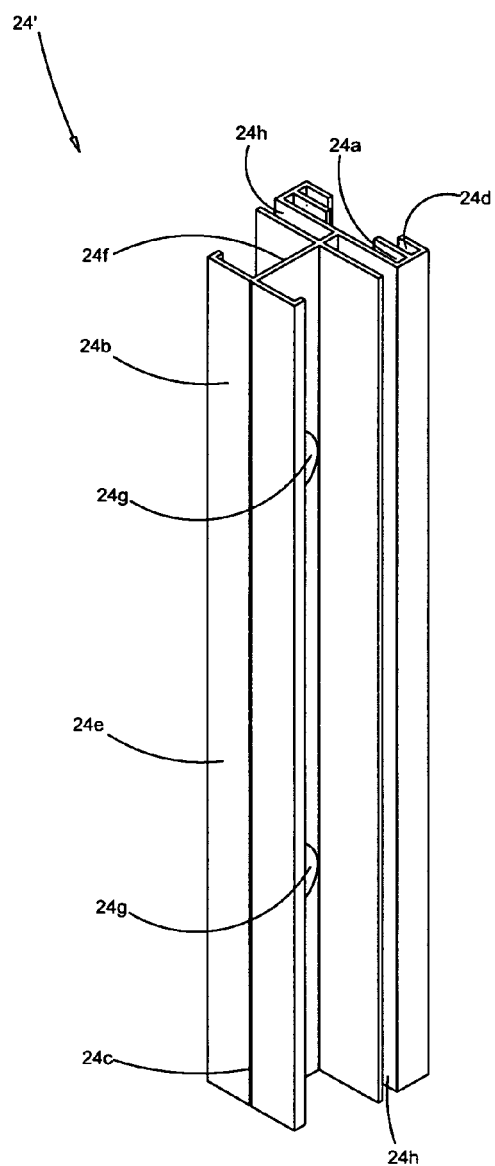
FIG. 5 is a perspective view of a second embodiment of a track member for use on an inner wall stud of the wall of FIG. 2 for providing the built-in services cavity.
Figure 6:
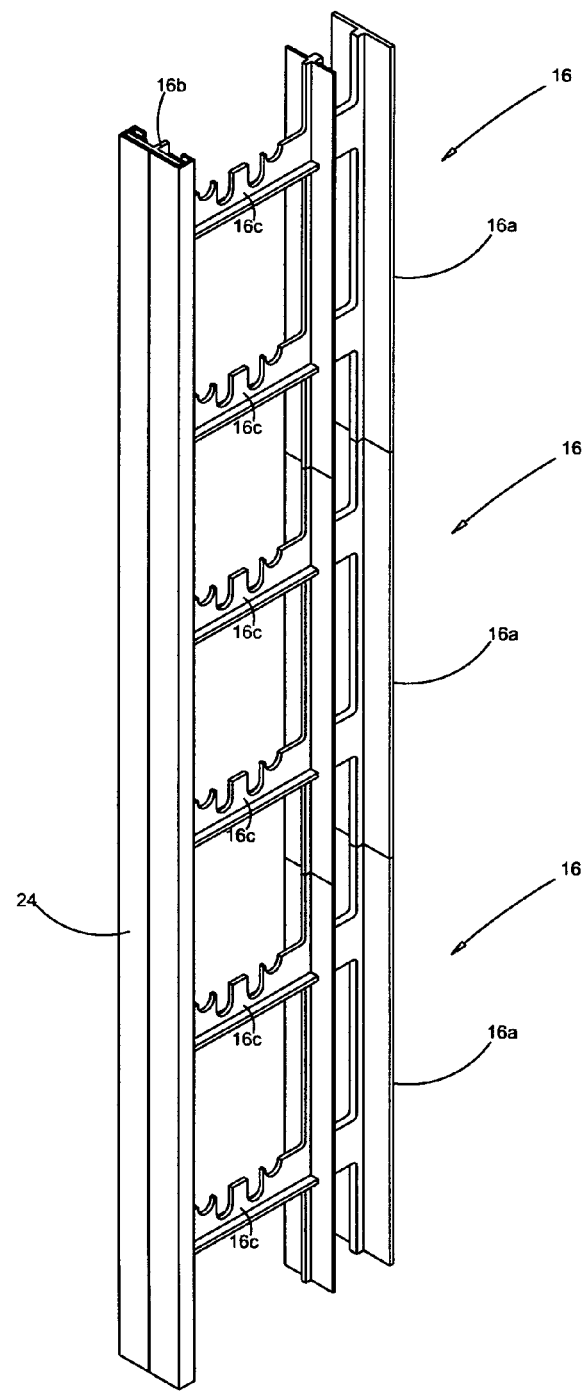
FIG. 6 is a perspective view of an assembly consisting of three frame members and a track member for the first wall embodiment of FIG. 1.
Figure 7:
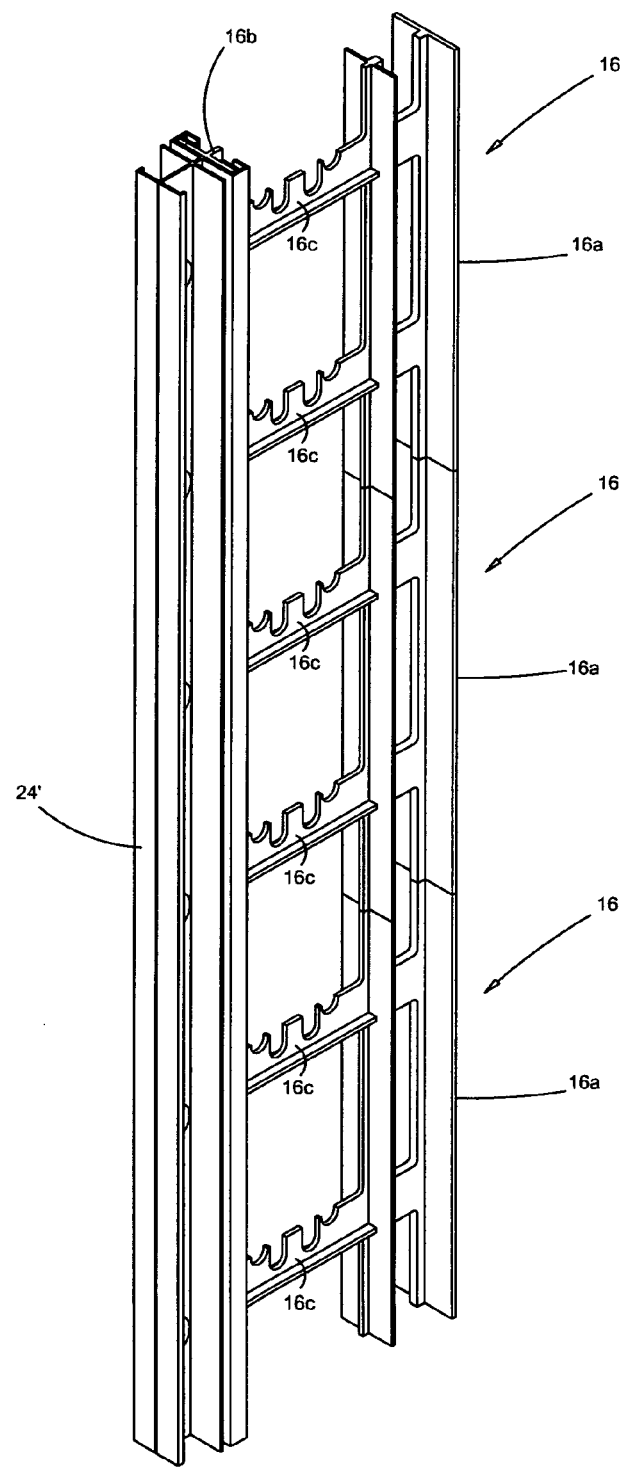
FIG. 7 is a perspective view of an assembly consisting of three frame members and a track member for the second wall embodiment of FIG. 2.
Figure 8:
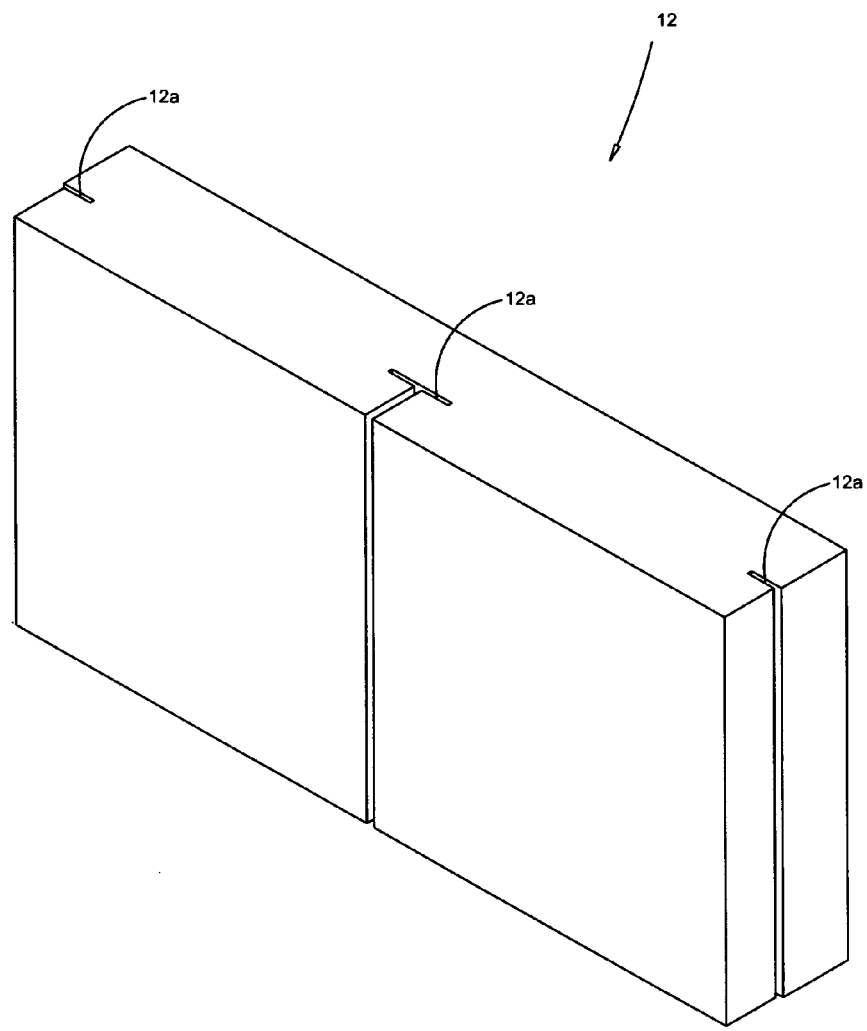
FIG. 8 is a perspective view of one module of an outer insulation panel with T-slots for use in the wall embodiments of FIGS. 1 and 2.

As shown in FIGS. 1, 2, 6, 7, 9 to 16, 18, 20, 21, 24 and 26, the inner flange 16b1 of each frame member module 16 is slidingly engaged in an elongate track member 24 or 24'. Two different track member embodiments are shown in FIGS. 4 and 5. The track members 24 and 24' both have a first substantially C-shaped channel 24a in which the inner flange 16b1 is slidably engageable. The length of the track member 24, 24' is greater than the length of the frame member modules 16, and is typically approximately 2400 mm or 8 feet long, such that eight frame member modules 16 are engaged in each channel 24a. Engagement of the flanges 16b1 in the channel 24a secures the outer ends of each frame member module 16 together to form a unitary frame member made up of the frame member modules 16.

Figure 29:
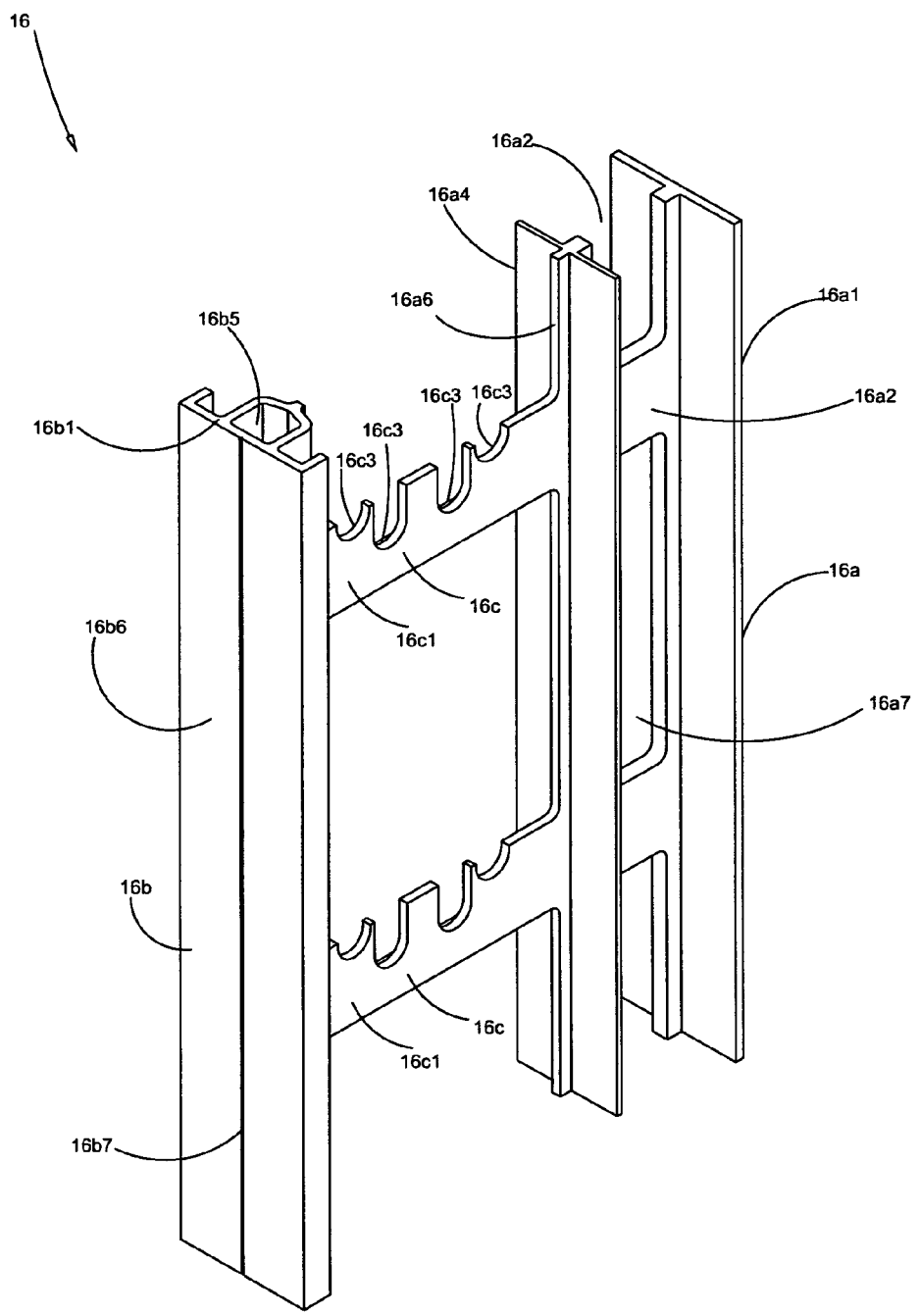
FIG. 29 is a perspective view of an embodiment of a frame member that provides a built-in services cavity.
Figure 30:
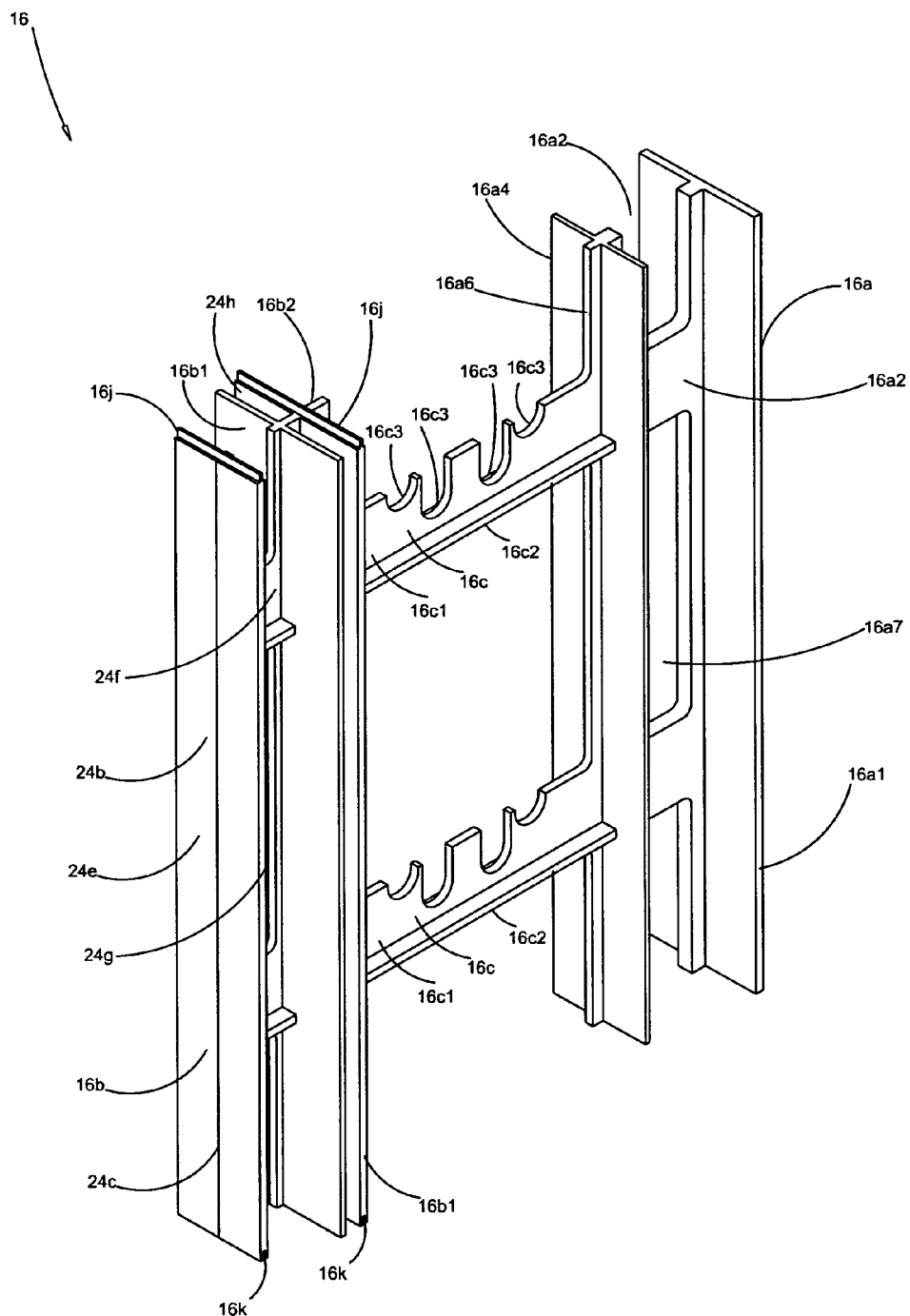
FIG. 30 is a perspective view of a further embodiment of a frame member that provides a built-in services cavity.

The track members 24, 24' comprise a flat mounting surface 24b for facilitating joining of drywall sheets to form the inner layer 14. The flat surface 24b comprises a central straight longitudinal linear groove 24c to facilitate alignment of drywall sheets to form the inner layer 14. The track members 24, 24' also comprise a second substantially C-shaped channel 24d, on a side of the first C-shaped channel 24a remote from the inner layer 14 (i.e. proximal to the outer stud 16a), to provide additional strength and rigidity and which may be used to secure any retaining clips or fittings for in-situ casting into the concrete wall 100. The inner layer 14 is connected to the track members 24, and thereby to the inner flange 16b1, using suitable adhesives and/or fasteners 25, such as screws, bolts, staples, or combinations thereof. In other embodiments, such as shown in FIGS. 29 and 30, the inner layer 14 can be connected directly to the inner flange 16b1 using suitable adhesives and/or fasteners, such as screws, bolts, staples, or combinations thereof.

Figure 2:
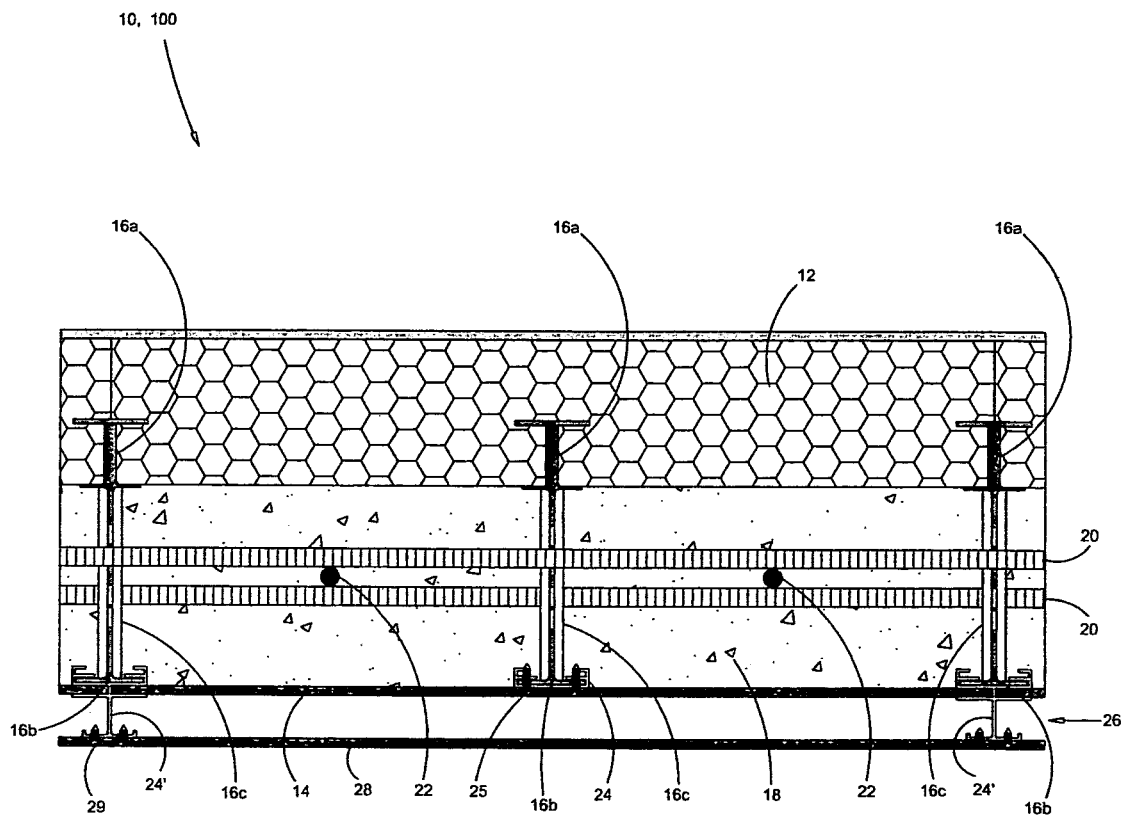
FIG. 2 is a top view of a second embodiment of an insulated concrete thermal mass wall constructed with a second embodiment of the presently disclosed system.

The track member 24' of FIG. 5 also comprises a cavity-forming flange 24e that extends parallel to the inner flange 16b1 and which is spaced apart from the inner flange and the first channel 24a, by a web 24f. The web 24f is provided with openings 24g to facilitate installation of services through the web. As shown in FIG. 2, a track member 24' may be used on every second or more frame members to create a services cavity 26 with a larger horizontal spacing between the webs 24f. In addition to the inner layer 14, which is slidably engageable in a slot 24h formed in the track member 24' and supports the uncured concrete 18 until it gains sufficient strength to become self-supporting, a non-structural lining layer 28 is also affixed to the cavity forming flange 24e using appropriate fasteners, such as screws 29, bolts, adhesive, or the like. Accordingly, in the track member 24', the flat mounting surface 24b and groove 24c are formed on the cavity forming flange 24e. It will be appreciated that the services cavity 26 defined between the inner layer 14 and lining layer 28, as best seen in FIG. 2, is well-suited for housing electrical wiring, communications cabling, plumbing, vacuum tubing, and the like.

The frame member modules 16 are preferably integrally formed in one-piece construction from recycled plastics, flame retardant plastics, composite plastics, or the like, using an injection moulding or extrusion process. Several frame member modules 16 may also be combined and manufactured as a 2400 mm/8 feet long, or 3000 mm/10 feet long, single piece unitary frame assemblies using advanced manufacturing processes like injection moulding, structural foam moulding, gas assist moulding or a combination of extrusion and machining processes. However, the frame member modules 16 may also be formed, for example, from combinations of plastics and metals, or other materials that are resistant to the chemical environment of curing concrete, and connected by welding or by appropriate mechanical fasteners, such as screws or bolts.

The track members 24 are preferably formed from recycled plastics, flame retardant plastics, composite plastics, or the like, using an extrusion process. However, they may also be formed, for example, from aluminium or other metals, or from other materials that are resistant to the chemical environment of curing concrete.

The outer layer 12 is preferably formed from a thick sheet or panel based foam insulation product, such as extruded or expanded polystyrene foam panels, phenolic foam panels, polyurethane foam panels, polysulfone foam panels, or the like, depending upon the desired performance criteria for the particular application and climate.

The inner layer 14 is preferably formed from fibre cement sheets, magnesium oxide sheets, calcium oxide sheets, or similar drywall materials which are strong enough to withstand the substantial forces of pouring and curing of concrete and which also accept interior paint or rendered finishes, depending on the desired performance criteria for the particular application and climate.

The lining layer 28 is preferably formed from gypsum sheets. However, fibre cement sheets, magnesium oxide sheets, calcium oxide sheets, or similar materials, may alternatively be used.

It will be appreciated that the frame member modules 16, outer layer 12 and inner layer 14 are not designed to be permanently load-bearing, but, rather, have adequate structural properties to support the concrete 18 while it is poured and until it cures.

To form an insulated thermal mass concrete wall 100 using the system 10, a plurality of the vertical frame members are formed by stacking several frame member modules 16 one on top of another. The inner flanges 16b1 of the frame member modules are slidingly engaged in the track members 24, or the track members may be slid over the inner flanges 16b1, to secure the inner ends of the frame member modules 16 together. The outer layer 12 is affixed to the outer flanges 16a1 by sleeving the slots 12a of the outer layer 12 over the outer studs 16a, or by sliding the outer flanges into the slots 12a, which also secures the inner ends of the frame member modules 16 together. A network of horizontal 20 and vertical 22 reinforcement bars is placed between the frame members, with the horizontal reinforcement 20 being supported by the slots 16c3 in the spacers 16c and the vertical reinforcement 22 being interlaced with the horizontal reinforcement 20, as discussed above. Visual inspection of the reinforcement 20, 22 can readily be conducted at this stage. The inner layer 14 is affixed to the inner flanges 16b1 using appropriate adhesives or fasteners, as discussed above, which extend through the track members 24 and into the inner flanges 16b1.

In the case of the FIG. 2 embodiment, the inner layer 14 of sheets slidably engages the slot 24h in the track members 24', such that mechanical fasteners do not need to be used with these track members to secure the inner layer 14. Once the outer 12 and inner layers 14 are affixed to the frame members 16, uncured concrete 18 is poured into the cavity between the inner and outer layers. The spacings between the spacers 16c in each frame member module 16 facilitate horizontal flow and distribution of the uncured concrete 18 along the wall 100. In wall embodiments having a services cavity 26, such as that shown in FIG. 2, the lining layer 28 is generally attached to the cavity forming flange 24e using adhesives or fasteners 29, as discussed above, after pouring the concrete 18 between the inner 14 and outer 12 layers. However, the lining layer 28 may be installed prior to pouring the concrete 18 if desired. Various stages of the process for forming the FIG. 1 wall embodiment are shown diagrammatically in FIGS. 6, 9, 10 and 11. Various stages of the process for forming the FIG. 2 wall embodiment are shown diagrammatically in FIGS. 6, 7, 13, 14 and 15.

Figure 12:
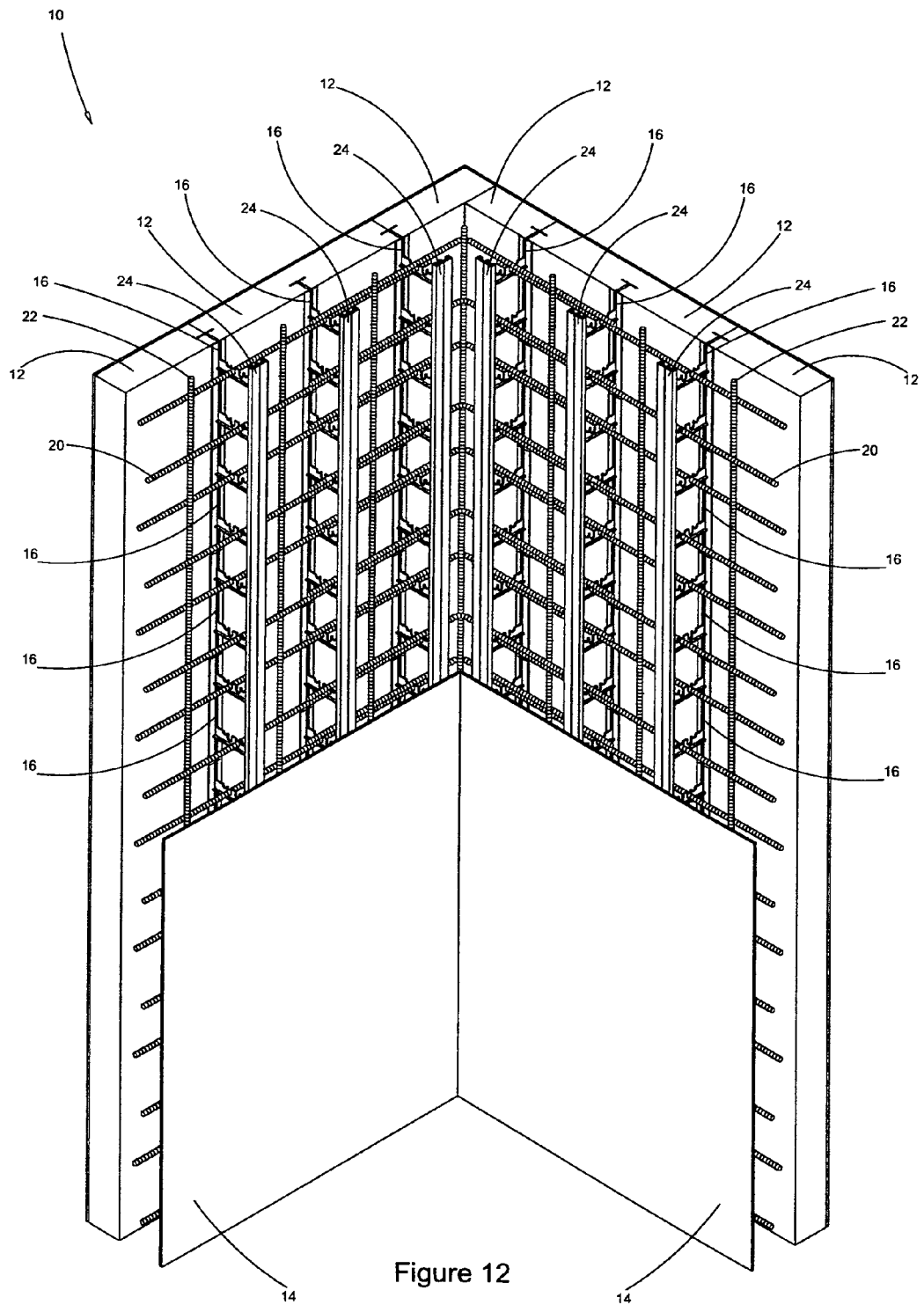
FIG. 12 is a perspective view similar to that of FIG. 11, but showing a full wall external corner assembly complete with corner reinforcement.
Figure 16:
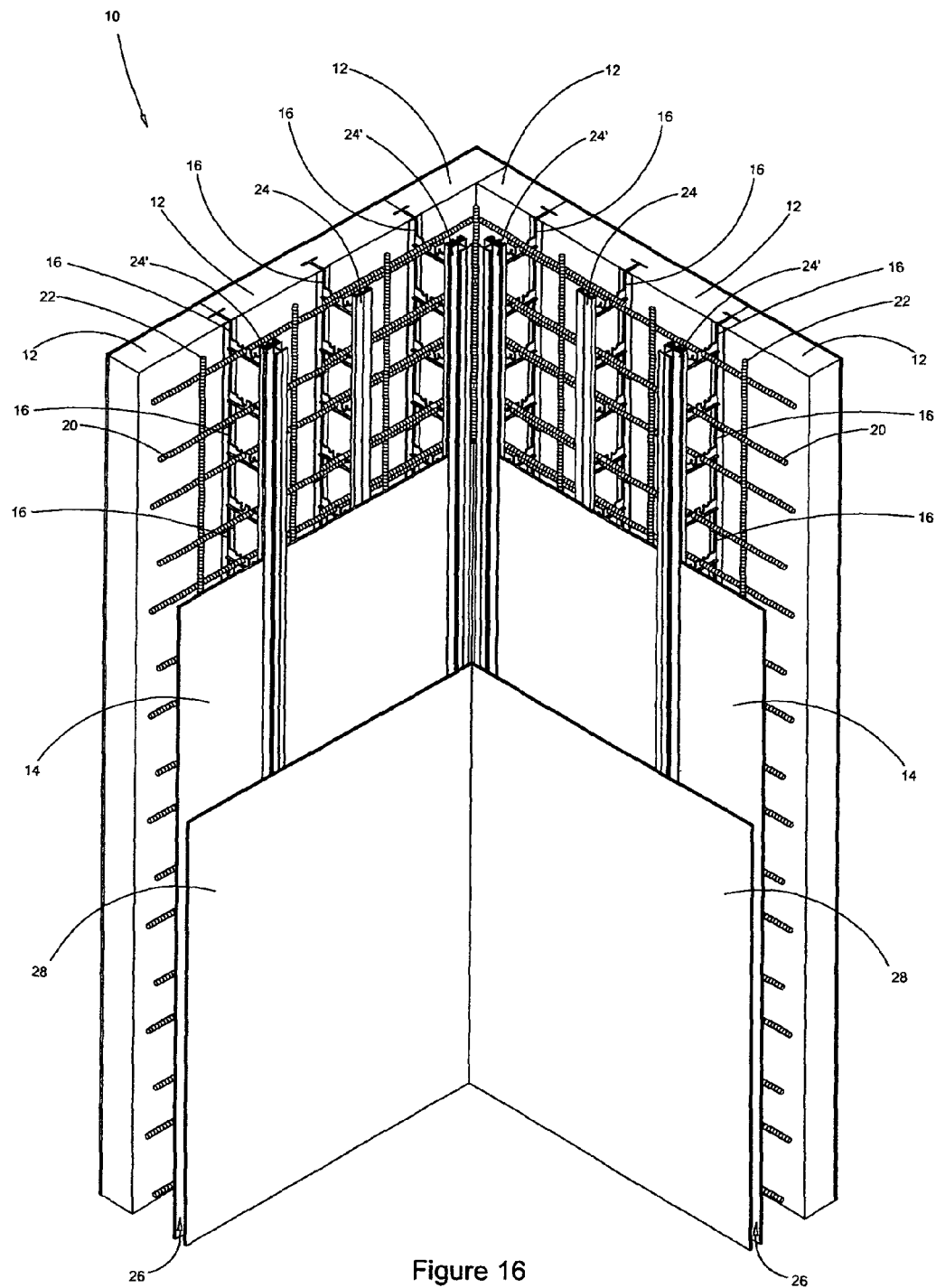
FIG. 16 is a perspective view similar to that of FIG. 15, but showing a full wall external corner assembly complete with corner reinforcement

FIG. 12 shows a typical arrangement for forming a wall corner in a FIG. 1 wall embodiment. Similarly, FIG. 16 shows a typical arrangement for forming a wall corner in a FIG. 2 wall embodiment.

Figure 17:
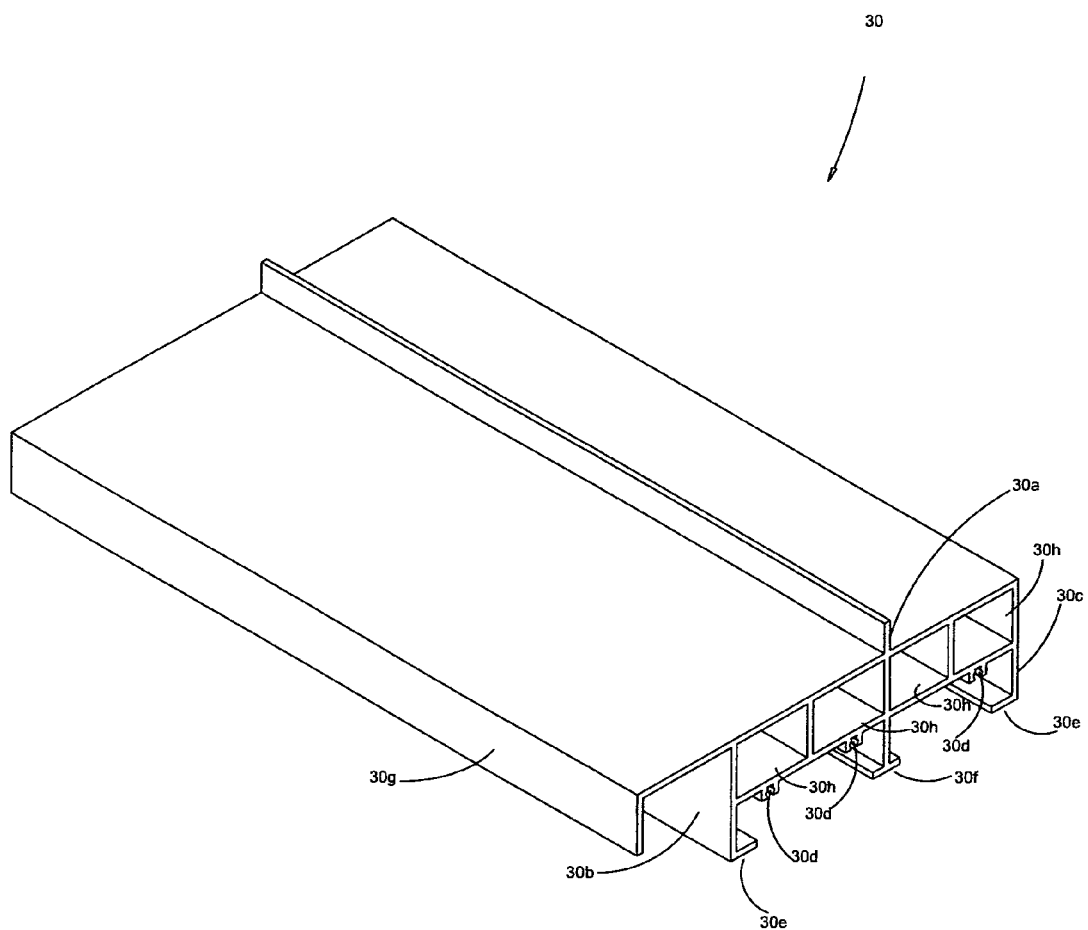
FIG. 17 is a perspective view of an integral window and door sub-frame for use in the present system to facilitate attachment and sealing of various types of commercially available windows and doors.
Figure 18:
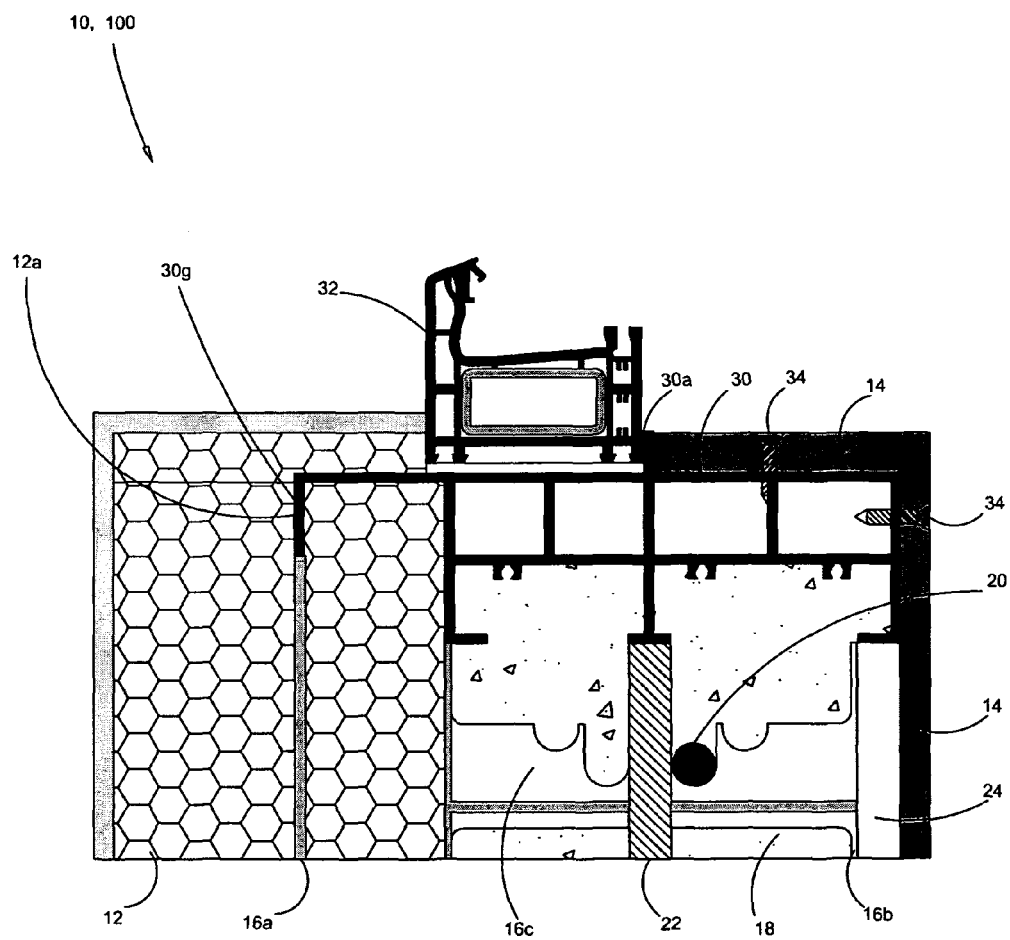
FIG. 18 is a transverse sectional view through a wall assembly as shown in FIG. 1, but also incorporating the integral window and door sub-frame of FIG. 17 and showing a typical window profile attached and fully sealed into the window and door sub-frame.

FIGS. 17 and 18 show an embodiment of an integral window and door sub-frame 30 for use in the FIG. 1 wall embodiment to facilitate attachment and sealing of various types of commercially available windows and doors. It will be appreciated that this window and door sub frame 30 may also be used in the FIG. 2 wall embodiment. The sub-frame 30 has an integral fin 30a which provides a straight and square surface against which the window or door profile 32 can be securely attached and sealed to inhibit water and air infiltration into the building. This integral fin 30a provides a physical barrier to the entry of water and air into the building, thus making the window and door attachment substantially waterproof and weatherproof. As shown, the sub-frame 30 has a outer flange 30g which slides and engages into slots 12a of the outer insulation layer 12 and physically secures the outer insulation layer 12 to the sub-frame 30 and enables the joint to withstand the substantial forces generated during the pouring and curing of concrete. The sub-frame 30 also has an outer web 30b against which the outer layer 12 can be attached and sealed using adhesives. An inner web 30c is also provided, against which the inner layer 14 can be attached and sealed using adhesives and/or screw fasteners 34. The sub-frame 30 further has built-in splines 30d, which allow for assembly using screw fasteners. The sub-frame 30 also has built-in anchor webs 30e and 30f, which become embedded and anchored in the concrete 18, thus securely attaching the sub-frame 30 in the concrete 18. The sub-frame 30 also has built-in longitudinal cavities 30h, which provide a thermal break between the sub-frame and the concrete and help to control condensation around the window and door openings. The longitudinal cavities 30h may also be filled with an insulation material like polystyrene foam or polyurethane foam to further insulate the sub-frame and further reduce cold bridging around window and door openings. The configuration of the sub-frame 30, with its integral fin 30a, not only inhibits the infiltration of water and air into the building but also reduces energy loss from the building and thus helps to substantially reduce the cost of heating and cooling the building. The sub-frame 30 is preferably formed from aluminium alloy, recycled plastic, or any other suitable plastic material using an extrusion process to attain a seamless straight and square profile.

Figure 19:
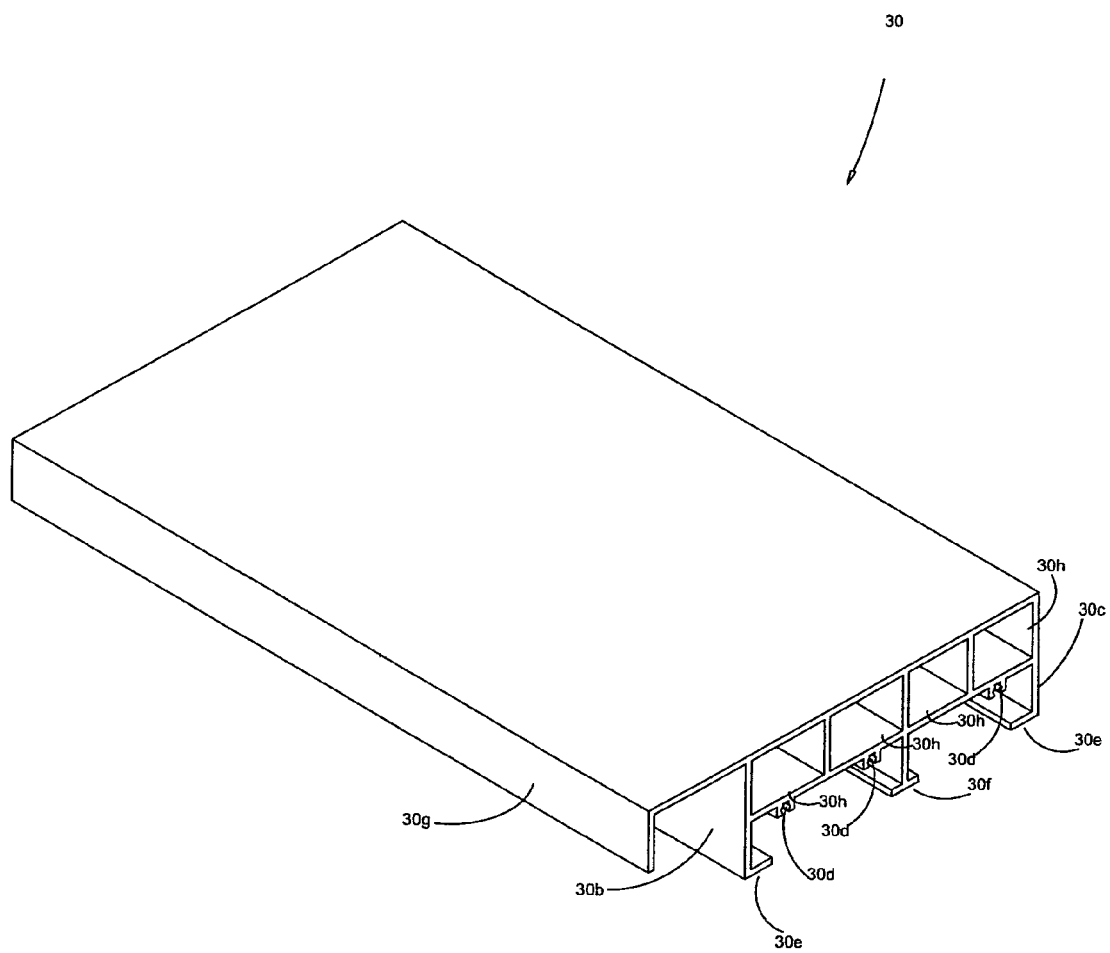
FIG. 19 is a perspective view of an alternative embodiment of an integral window and door sub-frame without the integral fin for use in the present system for attachment of doors in internal walls and also for use as a wall end closer to facilitate the creation of structural movement joints.
Figure 20:
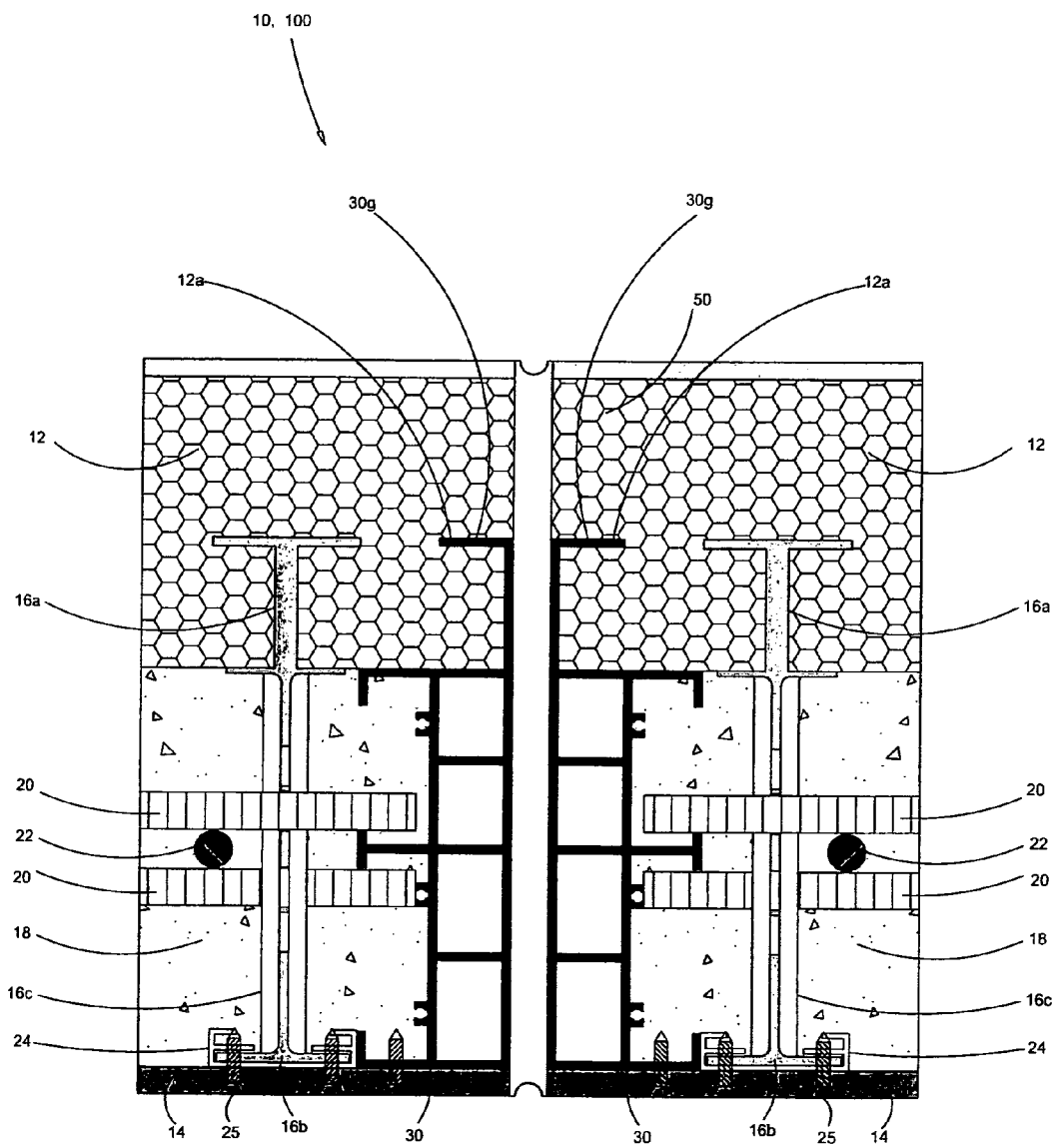
FIG. 20 is a longitudinal sectional view through a wall assembly as shown in FIG. 1, showing how the alternative embodiments of the integral window and door sub-frames of FIG. 19 are used as wall end closers for the creation of structural movement joints.

FIGS. 19 and 20 show an alternative embodiment of an alternative integral window and door sub-frame 30, which has many features in common with those described above, where corresponding reference numerals indicate corresponding features with corresponding functionality. This alternative embodiment, however does not have the integral fin 30a, which allows it to be used for attachment of doors in internal walls and also to be used as an end wall closer to facilitate the creation of structural movement joints 50, as best shown in FIG. 20.

FIG. 21 shows a third embodiment of an insulated concrete thermal mass wall with many features in common with the wall embodiments of FIGS. 1 and 2, where corresponding reference numerals indicate corresponding features with corresponding functionality. In the FIG. 21 embodiment, however, the outer stud 16a has a web 16a2 of sufficient length to extend through the insulating layer, such that the outer flange 16a1 of the outer stud extends completely through the insulating layer 12 to slidingly engage an outer elongate track member 24. Appropriate fasteners, such as screws, bolts, adhesive, or the like, may be used to affix a cladding layer 52 to the outer track member 24, and thereby to the outer stud flange 16a1. It will be appreciated that, whilst not shown, this embodiment may also use track members 24' on the inner stud 16b to provide a services cavity.

Figure 22:
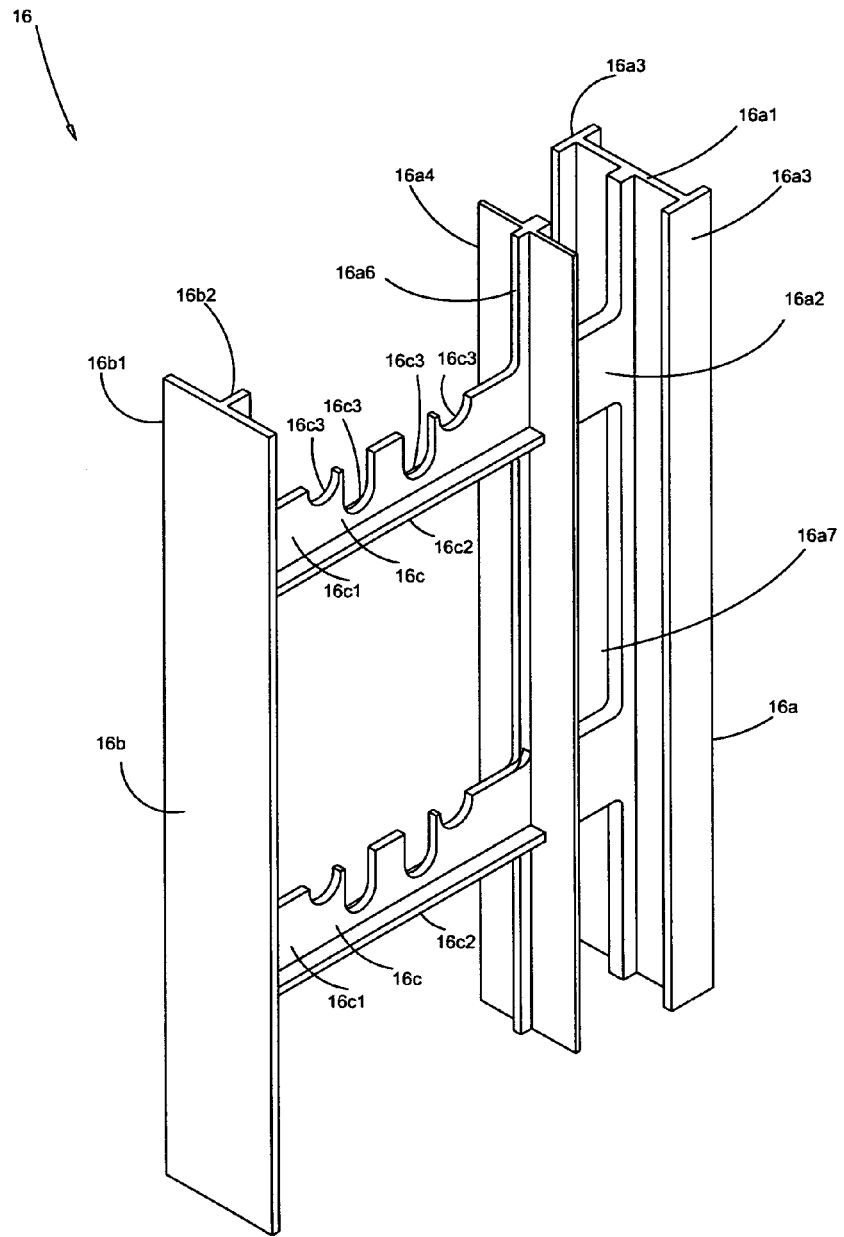
FIG. 22 is a perspective view of an alternative embodiment of a frame member in accordance with the present disclosure, which provides additional interlocking to more securely hold together the outer insulation panels.
Figure 23:
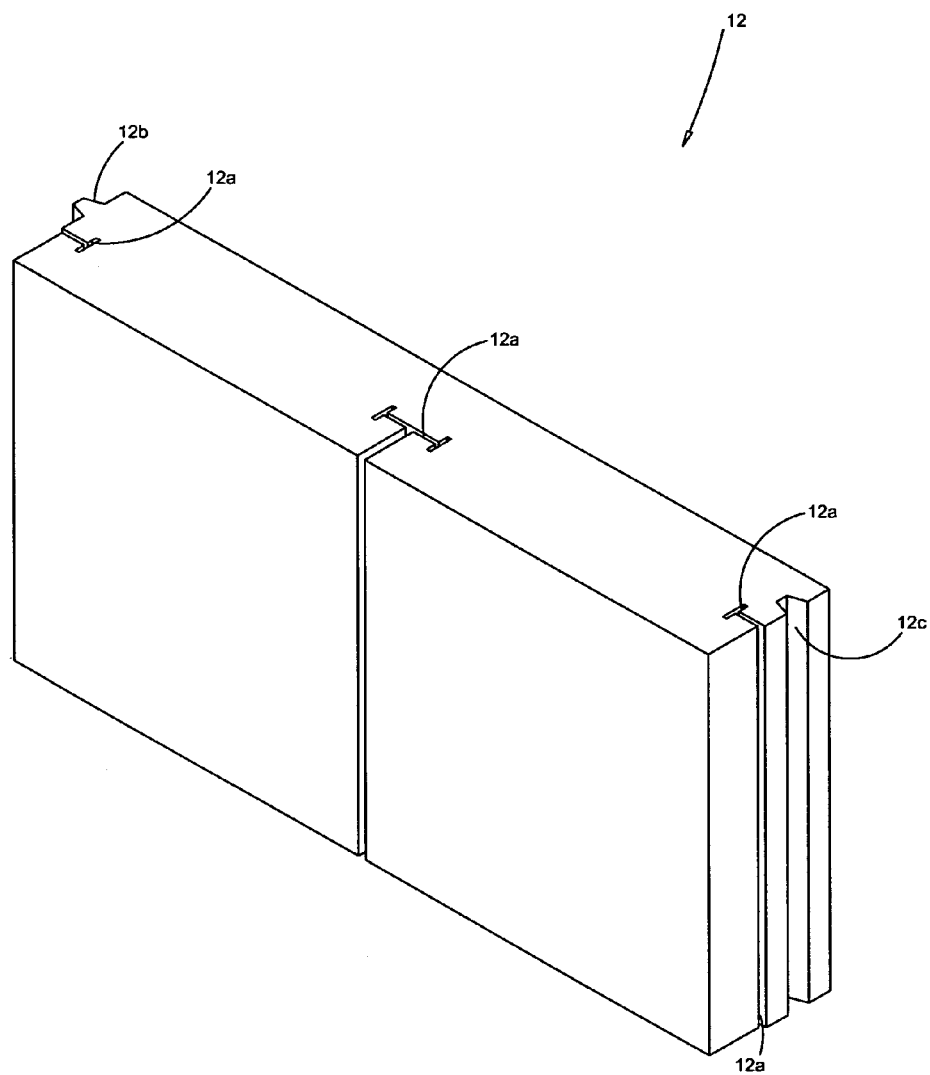
FIG. 23 is a perspective view of a module of an outer insulation panel for use with the frame member embodiment of FIG. 22.

FIGS. 22 to 24 show an alternative embodiment with many features in common with those described above, where corresponding reference numerals indicate corresponding features with corresponding functionality. In this alternative embodiment, however, the outer stud 16a is provided with a more complex cross-sectional profile to increase interlocking performance with the outer layer 12. The more complex cross sectional profile includes perpendicular flanges 16a3 at distal ends of the outer flange 16a1 to lock adjoining sheets in the outer layer 12 together against horizontal movement relative to one another. In this embodiment, as shown in FIGS. 23 and 24, the sheets in the outer layer 12 are provided with tongue 12b and groove 12c formations for further enhancing interlock of adjoining sheets in the outer layer, and for improving weatherproofing. It will be appreciated that, whilst not shown, the wall embodiment of FIG. 24 may also use track members 24' to provide a services cavity.

Figure 25:
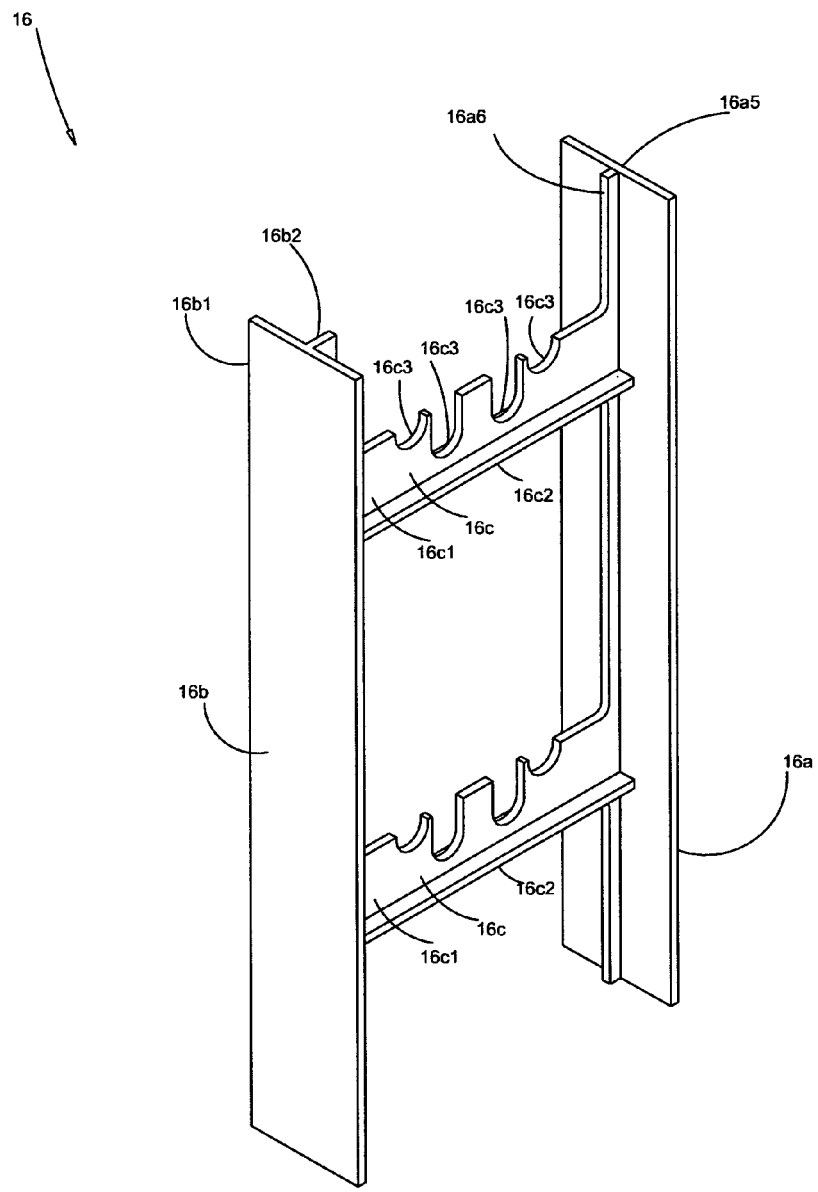
FIG. 25 is a perspective view of an alternative embodiment of a frame assembly that can be used for forming concrete walls without any insulation for use in internal walls of buildings.

FIG. 25 shows an alternative frame member embodiment with many features in common with the embodiment of FIG. 3, where corresponding reference numerals indicate corresponding features with corresponding functionality. This alternative embodiment, however, is configured for forming an internal wall without an insulating layer 12. As such, the outer stud 16a includes a simple flange 16a5, similar to the inner flange 16b1 of the inner stud 16b. The flange 16a5 is adapted to slidably receive a track member 24 or 24', as shown in FIG. 4 or FIG. 5, depending on whether or not a cavity is required for installation of services on that side of the wall.

Figure 26:
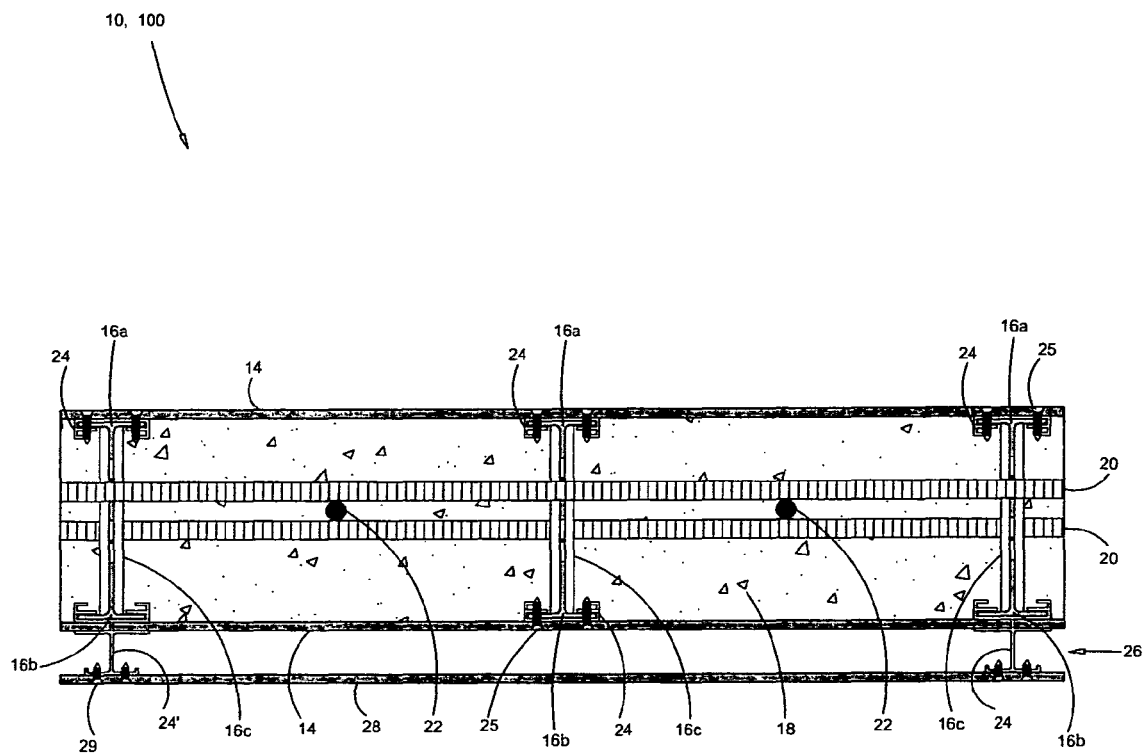
FIG. 26 is a top view of a fourth embodiment of an uninsulated concrete thermal mass wall constructed with a fourth embodiment of the presently disclosed system using the alternative frame members of FIG. 25 for use in internal walls of buildings.

FIG. 26 shows a fourth embodiment providing an uninsulated concrete thermal mass wall 100 with many features in common with the wall embodiments of FIGS. 1 and 2, where corresponding reference numerals indicate corresponding features with corresponding functionality. In the FIG. 26 embodiment, however, the alternative frame member of FIG. 25 is used to slidably receive track members 24 and 24' to form an uninsulated internal wall with a services cavity on one side of the wall. It will be appreciated that, whilst not shown, the wall embodiment of FIG. 26 may also use track members 24 and 24' on studs 16a to provide a services cavity on both sides of the wall.

Figure 27:
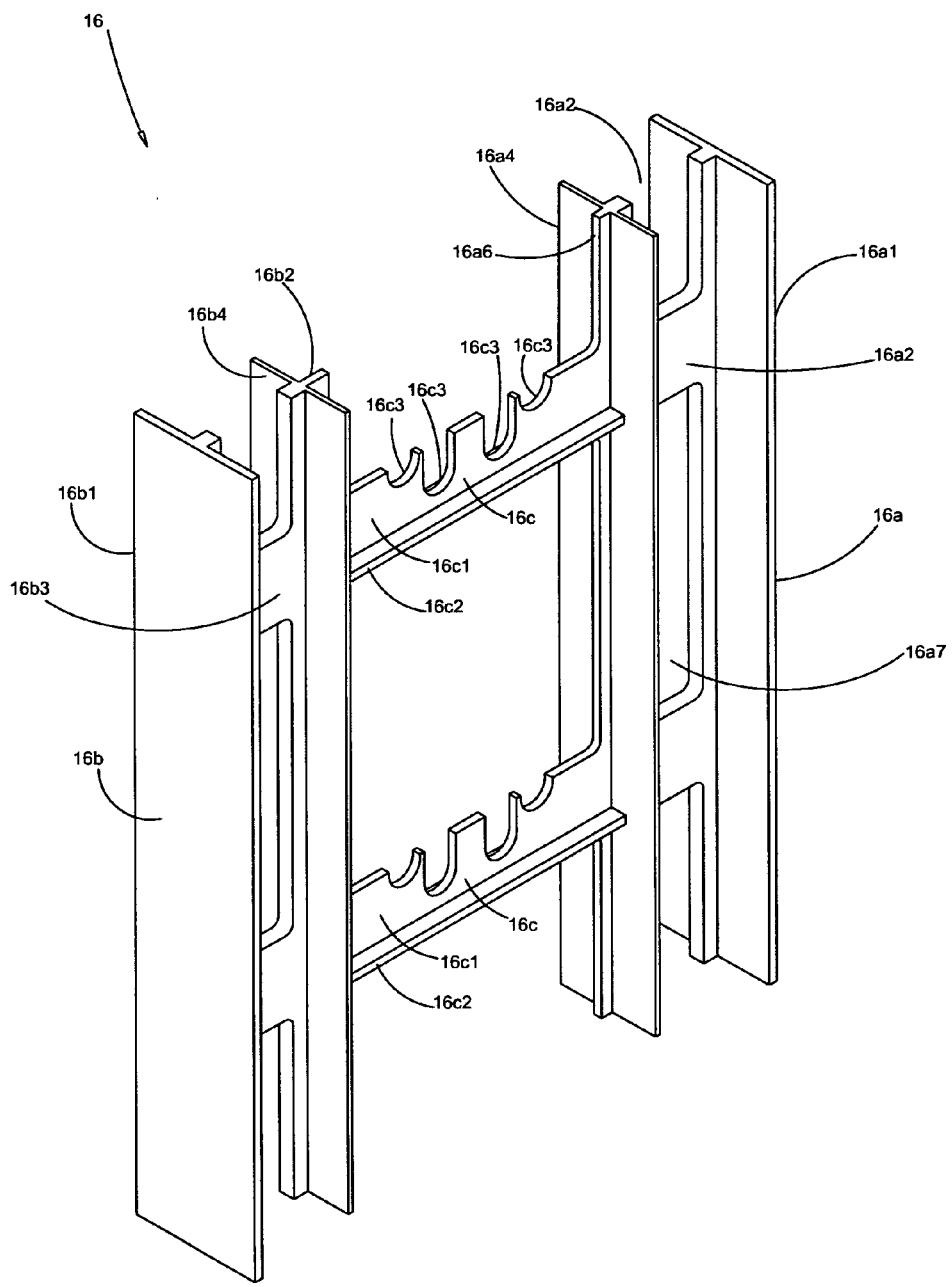
FIG. 27 is a perspective view of an alternative embodiment of a frame assembly that can be used for forming concrete walls with insulation on both sides for use in basements walls of buildings.

FIG. 27 shows an alternative frame member embodiment with many features in common with the embodiment of FIG. 3, where corresponding reference numerals indicate corresponding features with corresponding functionality. This alternative embodiment, however, is configured for forming concrete walls with insulation on both sides for use in basement walls of buildings. In this alternative embodiment, the inner stud 16b is substantially the same as the outer stud 16a, which allows it to slide into slots 12a of an inner insulation layer 12 to form a concrete wall which is insulated on both sides.

Figure 28:
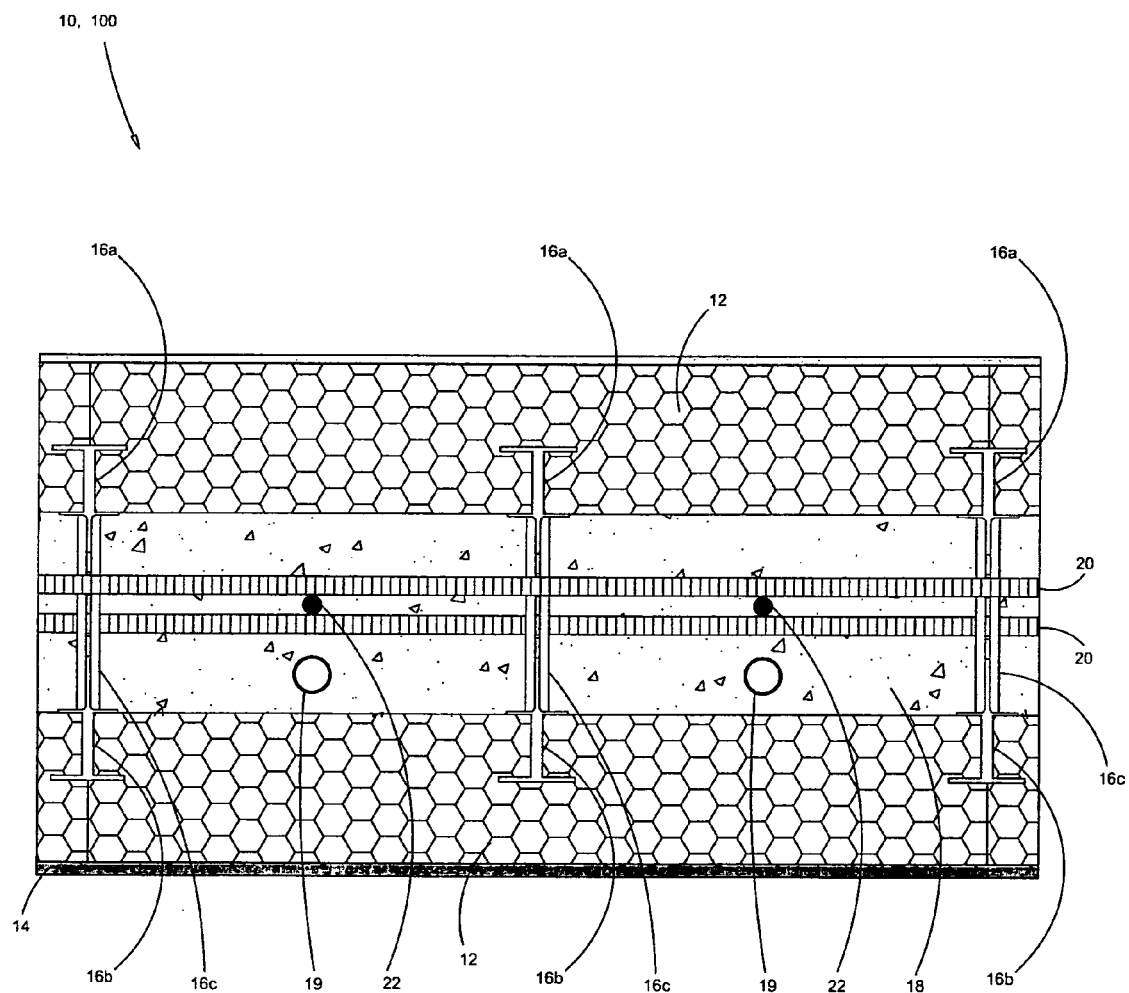
FIG. 28 is a top view of a fifth embodiment of an insulated concrete thermal mass wall constructed with a fifth embodiment of the presently disclosed system using the alternative frame members of FIG. 27 to create a concrete wall which is insulated on both sides for use in basement walls of buildings.

FIG. 28 shows a fifth embodiment of an insulated concrete thermal mass wall 100 with many features in common with the wall embodiments of FIGS. 1 and 2, where corresponding reference numerals indicate corresponding features with corresponding functionality. In the FIG. 28 embodiment, however, the alternative frame member of FIG. 27 slides into slots 12a of the outer and inner insulation layers 12.to form a concrete wall 100 which is insulated on both sides for use in basement walls of buildings.

FIG. 29 shows an alternative frame member embodiment with many features in common with the embodiment of FIG. 3, where corresponding reference numerals indicate corresponding features with corresponding functionality. The inner flange 16b1 in this alternative embodiment, however, includes a built-in services cavity 16b5. Also, a mounting surface 16b6 for the sheets for forming the inner layer 14 is provided on the inner flange 16b1, along with a score line 16b7 for facilitating accurate alignment of the sheets.

FIG. 30 shows an alternative frame member embodiment with many features in common with the embodiments of FIG. 3, where corresponding reference numerals indicate corresponding features with corresponding functionality. In this alternative embodiment, however, the inner flange 16b1 is integrally formed in one-piece construction with the cavity-forming flange 24e and other features of track member 24'. Accordingly, a separate track member 24' is not required. Also, tongue 16j and groove 16k formations are provided on respective upper and lower ends of the cavity forming flange 24e and inner flange 16b1 to facilitate connection of several lengths of the frame member modules 16 to form a unitary vertical frame member. Again, openings 24g are provided in the web 24f to facilitate passage of services across the web.

Figure 31:
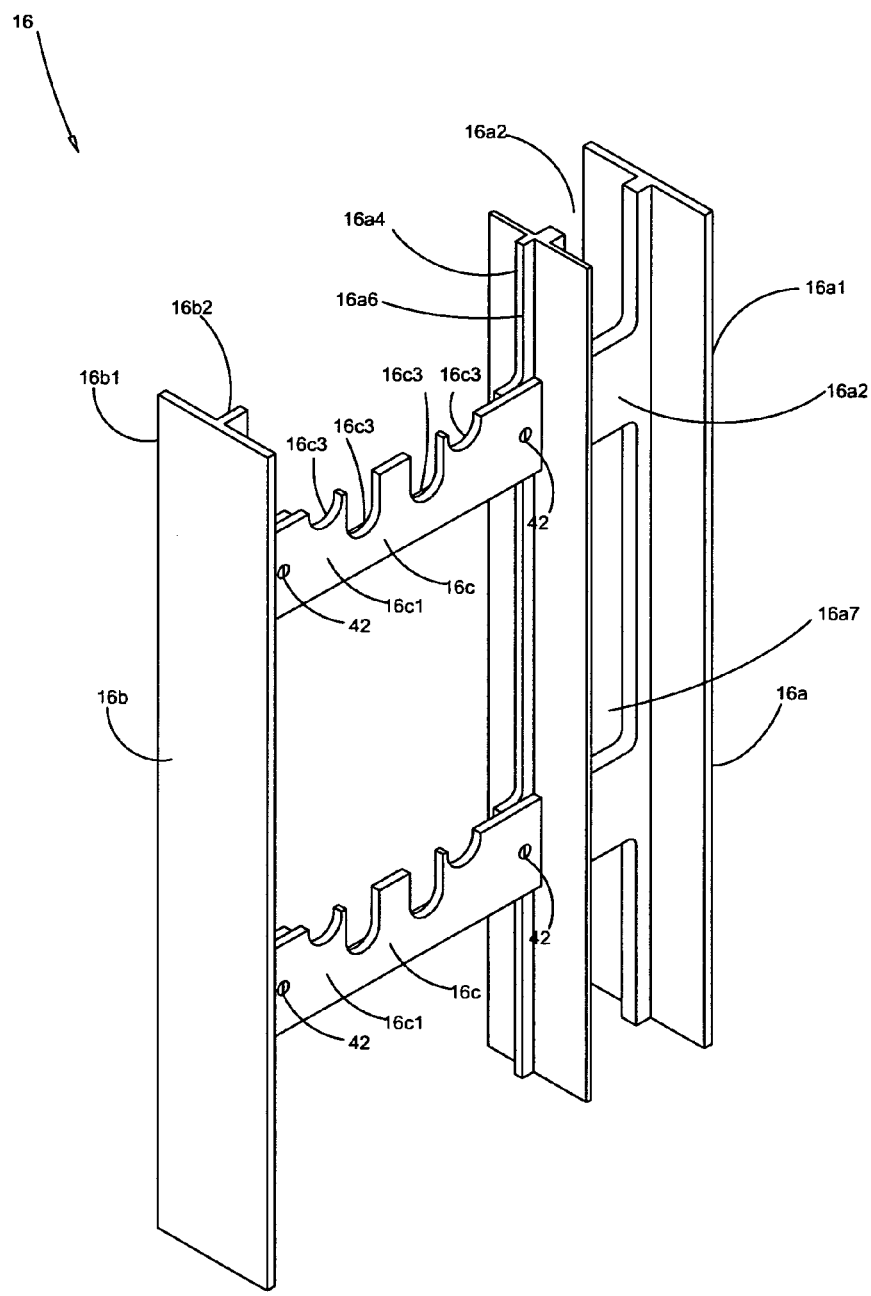
FIG. 31 is a perspective view of a frame member that is similar to that of FIG. 3, but which has built-in steel spacers use in fire-rated walls.

FIG. 31 shows an alternative frame member embodiment with many features in common with the embodiment of FIG. 3, where corresponding reference numerals indicate corresponding features with corresponding functionality. This alternative embodiment has, however, been strengthened for use in fire-rated walls. The strengthening is provided by forming the spacers 16c from fire-rated steel and connecting the spacers to the inner 16b and outer 16a studs with appropriate fasteners 42; such as screws, bolts, or the like.

Figure 32:
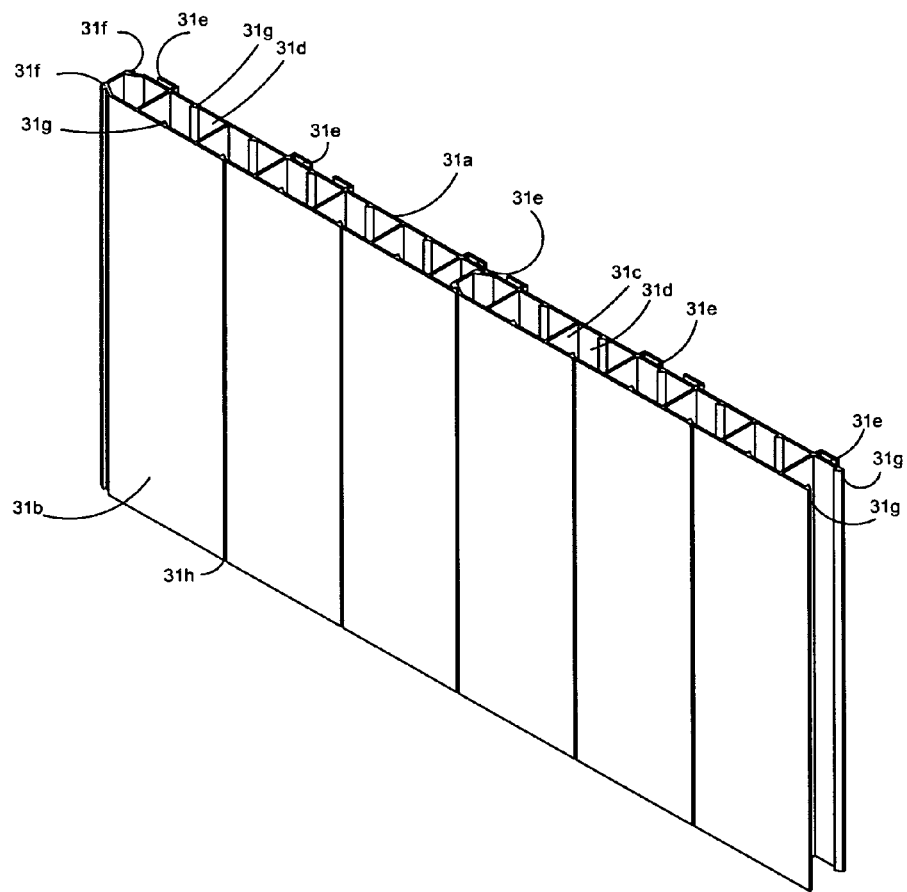
FIG. 32 is a perspective view of an alternative inner layer embodiment, which is configured for forming moisture proof and water proof concrete walls for use in the basement walls of buildings which have a high risk of water seepage.

FIG. 32 shows an alternative inner layer embodiment 31, which is configured for forming moisture proof and water proof concrete walls for use in basement walls of buildings, which have a high risk of water seepage, such as buildings in very cold and snowy climates or in areas where the underground water table is very high; basically conditions that may lead to saturation of conventional mineral-based drywall inner layers.

This alternative inner layer embodiment 31 is preferably formed from materials that are not wetted or saturated in contact with water, such as recycled plastics, flame retardant plastics, composite plastics, fibreglass reinforced plastics and the like, using an extrusion process. As shown, this alternative inner layer embodiment 31 is preferably formed in modules consisting of an inner surface 31a and an outer surface 31b, which are joined together by webs 31c, to form an integral services cavity 31d for easy installation of electrical, communication, plumbing, gas, vacuum and other services in the inner walls.

This alternative inner layer embodiment 31 has substantially C-shaped channels 31e in which the inner flange 16b of the frame member 16 are slidably engageable.

The alternative inner layer embodiment 31 also has tongues 31f and grooves 31g for snap-fitting and interlocking of the adjacent inner layer modules in a snug and water tight manner. Adhesives and sealants may also be applied on these tongue and grooves to further enhance the water proofing of the joints. It may also be provided with additional grooves 31g at regular intervals to help to create small width modules simply by cutting near a pair of grooves 31g and engaging them with the tongues 31f of the adjacent module.

The outer layer 31b of the alternative inner layer embodiment 31 may also be provided with various types of attractive integral colours and finishes, such as grooving 31h, wood grains, embossing, etcetera, to enhance the interiors of the basement walls without the need for any additional painting, cladding or finishing.

Figure 33:
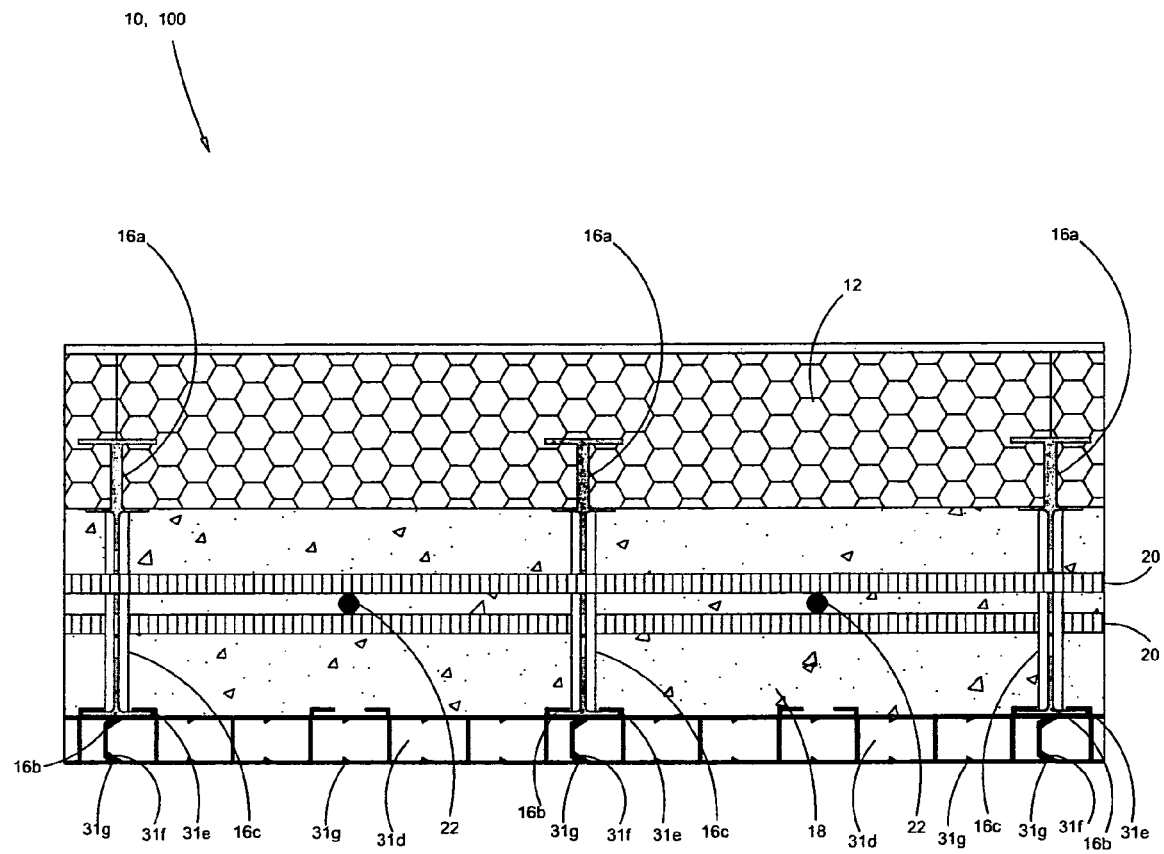
FIG. 33 is a top view of a sixth embodiment of an insulated concrete thermal mass wall constructed with the alternative inner layer embodiment of FIG. 32 to create a concrete wall which is insulated on the outer side and has a moisture proof and water proof inner layer on the inside for use in basement walls of buildings which have a high risk of water seepage.

FIG. 33 shows a sixth embodiment of an insulated concrete thermal mass wall 100 with many features in common with the wall embodiments of FIGS. 1 and 2, where corresponding reference numerals indicate corresponding features with corresponding functionality. In the FIG. 33 embodiment, however, the C-shaped channels 31e of the alternative inner layer 31 slide over the inner flanges 16b of the frame members 16 to form a concrete wall 100 that is insulated on the outer side and has a moisture proof and water proof inner layer on the inside for use in basement walls of buildings, which have a high risk of water seepage, such as buildings in very cold and snowy climates or in areas where the underground water table is very high. It will be appreciated that, whilst not shown, the alternative inner layer embodiment 31 may also be used on the outside of the concrete for forming moisture proof and water proof basement walls without any insulation or for forming outdoor retaining walls and feature walls without any insulation.

Figure 34:
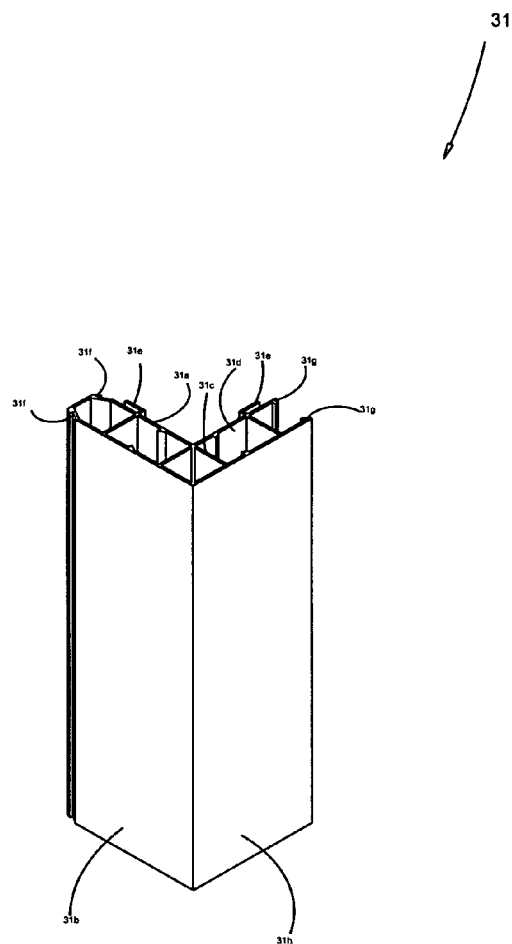
FIG. 34 shows a corner module of the alternative inner layer embodiment of FIG. 32 for forming moisture proof and water proof corners of concrete walls for use in the basement walls of buildings which have a high risk of water seepage.

FIG. 34 shows a corner module of the alternative inner layer embodiment with many features in common with the embodiment of FIG. 32, where corresponding reference numerals indicate corresponding features with corresponding functionality. This corner module has, however, been configured for easy interlocking into the alternative inner layer embodiment modules for forming moisture proof and water proof corners of concrete walls for use in the basement walls of buildings, which have a high risk of water seepage, such as buildings in very cold and snowy climates or in areas where the underground water table is very high.

FIGS. 35 and 36 show an embodiment of an integral track member 32 for use as a bottom starting track as well as a top closing track in the FIG. 1 wall embodiment to facilitate accurate and quick assembly of the wall system. It will be appreciated that this track member 32 may also be used in the FIG. 2 wall embodiment. The track member 32 has an integral web 32a, which can be placed at the bottom of the concrete wall for use as a starter track, or which can be placed over the top of the concrete wall for use as a closing track. As shown, the integral web 32a also has small circular holes 32f for attaching the integral track member to the concrete slab, as well as medium circular holes 32g for correctly locating and placing the vertical reinforcement bars 22 through the centre of the concrete wall. Further, the integral web 32a also has large rectangular slots 32e to facilitate the vertical flow and distribution of uncured concrete through the top track and also to facilitate the vertical flow and distribution of uncured concrete through the bottom track for onward bonding to the concrete slab.

As further shown, the track member 32 has an outer flange 32d, which slides and engages into slots 12a of the outer insulation layer 12 and physically secures the outer insulation layer 12 to the track member 32 and enables the bottom and top of the wall to withstand the substantial forces generated during the pouring and curing of concrete. The track member 32 also has an outer web 32b against which the outer layer 12 can be attached and sealed using adhesives. An inner web 32c is also provided, against which the inner layer 14 can be attached and sealed using adhesives and/or screw fasteners 34. The track member 32 is preferably formed from aluminium alloy, recycled plastic, or any other suitable plastic material using an extrusion process to attain a seamless straight and square profile.

It will be appreciated that the illustrated insulated concrete thermal mass wall systems enhance energy efficiency by utilising the properties of thermal mass to naturally keep building interiors comfortable across changing seasons. The illustrated systems are also easy to use and facilitate significant savings in expensive site labour as well as overall production costs. The illustrated systems allow the concrete thermal mass to directly interact with the interiors of a building, by virtue of the wall not having a inner insulation layer, to enable the interiors of the building to derive benefits from the energy storage properties of the externally insulated thermal mass concrete wall. In other words, because there is no insulation provided on the inner drywall layer side of the frame members, thermal energy transfer is facilitated on this side of the wall system. The illustrated systems also provide for a services cavity within the insulated thermal mass wall. The illustrated systems also provide for the incorporation of interior drywall to facilitate interior paint or rendered finishes with associated significant savings in costs. The illustrated systems further provide for the incorporation of an integral window and/or door sub-frame to facilitate attachment and sealing of various types of conventional windows and doors to reduce the likelihood of water and air infiltration into the building. The illustrated systems further provide for the inclusion of an integral window and door sub-frame for attachment of doors in internal walls and also for use as an end wall closer to facilitate the creation of structural movement joints in the insulated concrete walls. The illustrated systems also facilitate placement, inspection and certification of steel reinforcement bars prior to pouring of concrete to form the wall. The illustrated systems also provide for the use of standard insulation panels, such as extruded or expanded polystyrene boards, polyurethane foam boards, polysulfone foam boards, phenolic boards, etc, for external insulation of the building. The illustrated systems also provide for the use of pre-meshed and pre-rendered insulation panels to facilitate exterior rendered finishes, with associated significant savings in site costs and works. The illustrated systems also provide for the use of insulation panels that are pre-laminated with fibre cement sheets, magnesium oxide sheets or other mineral based sheets for providing additional physical protection as well as fire resistance to the exteriors of buildings. The openings between the spacers in the illustrated systems also facilitate flow of uncured concrete along the length of the cavity formed between the inner and outer layers. The illustrated systems are also well suited for production in a modular format based on standard frame member module dimensions of 300 mm (or 12 inches) to facilitate significant savings in time and costs both in production as well as site assembly. An un-insulated version of the system, with or without built-in services cavities, is also provided for use in internal walls of a building. An embodiment of the system is also provided to form a concrete wall which is insulated on both sides inside, as well as outside for use in basement walls of buildings.

Persons skilled in the art will understand that numerous variations and/or modifications may be made to the above described embodiments without departing from the broad general scope of the present disclosure. The above embodiments are, therefore, to be considered in all respects as illustrative and not restrictive. Examples of possible modifications include, but are not limited to:

- the track member may have only a single thin C-shaped channel in order to achieve a space saving compact slimline profile with savings in material and manufacturing costs;
- two of the above track members each with a single thin C-shaped channel may slide over the inner flanges of the inner studs as well as the outer flanges of the outer studs of a plurality of frame member modules to create a pre-assembled unitary frame member and track member assembly for further savings in site assembly time and cost;
- the above pre-assembled unitary frame member and track member assembly may have various configurations which allow use to form walls, for example walls with only outer insulation, walls with only inner insulation, walls with insulation on both sides, walls without any insulation on either side, walls with a service cavity or walls without service cavities, etc, depending on the requirements of a particular project;
- the system for forming an insulated concrete thermal mass wall as described above may be pre-assembled in a factory, or can be assembled on site by either a builder or a do it yourself owner-builder;
- the frame members and track members may all be combined and manufactured as a 2400 mm/8 feet long or 3000 mm/10 feet long single piece unitary frame and track assembly using advanced manufacturing processes like injection moulding, structural foam moulding, gas assist moulding or a combination of extrusion and machining process;
- a plurality of frame member modules may be factory assembled using modern manufacturing processes, such as ultra sonic welding or high frequency welding, to create a 2400 mm or 8 feet long single piece unitary frame assembly which may also be used directly for formation of walls without the need of track members;
- the connection between the spacers and the outer and/or inner studs may be a mechanical connection. Eg., the studs may be pre-fabricated with connecting formations at predetermined intervals for engagement by corresponding connecting formations on the spacers to mechanically interconnect the spacers and studs;
- the track member may snap-lockingly engage the inner flange, or have an alternative mechanism of interference fit with the inner flange, rather than slidably engage the inner flange;
- the outer layer may be formed from pre-meshed and pre-rendered insulation panels for facilitating rendered finishes for the exteriors of a building, with associated significant savings in site costs and works; and/or
- the outer layer may be formed from insulated panels which are pre-laminated with fibre cement sheets, magnesium oxide sheets and/or other mineral based sheets for providing additional physical protection as well as fire resistance to the exteriors of a building, with associated significant savings in site costs and works.

The invention claimed is:

1. A frame member for installation between an outer insulation layer and an inner drywall layer in an insulated thermal mass concrete wall;
   the wall having a top, a bottom, and a height that extends from the top to the bottom;
   the outer insulation layer, the inner drywall layer and the frame member each extending substantially the height of the wall, said frame member comprising:
   an outer stud adapted to have the outer insulation layer affixed thereto;
   an inner stud adapted to have the inner drywall layer affixed thereto;
   a plurality of spacers extending between the outer stud and the inner stud to interlock the outer stud and inner stud together in a spaced apart relationship;
   the inner stud comprising an inner flange extending substantially transverse to a length of the spacers, the inner flange defining a slot for slidably receiving the inner drywall layer; and
   a cavity forming flange connected to the inner flange and located on a side of the inner flange away from the outer stud, the cavity forming flange extending parallel to the inner flange and spaced apart from the inner flange to form a cavity therebetween to facilitate installation of conduits, wherein an opening is defined by the spacers and the outer stud and inner stud, with the opening being sized to permit flow of uncured concrete there through if the uncured concrete is poured between the outer insulation layer affixed to the outer stud and an inner drywall layer affixed to the inner stud.

2. A frame member according to claim 1, wherein the spacers comprise one or more slots for positioning reinforcement for the uncured concrete to be poured between the inner drywall layer and the outer insulation layer.

3. A frame member according to claim 2, wherein the one or more slots comprises a plurality of slots, the plurality of slots being of different lengths and/or being provided at different axial positions to facilitate a tailored arrangement of the reinforcement.

4. A frame member according to claim 1, wherein the outer stud comprises an outer flange extending substantially transverse to a length of the spacers.

5. A frame member according to claim 4, wherein the outer stud comprises a second flange, located inwardly of the outer flange, and adapted to bear against an inner surface of the outer insulation layer to inhibit flow of the uncured concrete into the outer insulation layer.

6. A frame member according to claim 1, wherein the cavity forming flange defines a flat mounting surface for facilitating attaching of a lining layer thereto.

7. A frame member according to claim 1, wherein the outer stud, the inner stud and the spacers of the frame member are integrally formed in one-piece construction.

8. A building system comprising insulated thermal mass concrete walls, said walls comprising:
  a plurality of first walls, each of the plurality of first walls comprising:
    a top, a bottom, and a height that extends from the top to the bottom;
    a first outer insulation layer that extends substantially the height of the first wall,
    a first inner drywall layer that extends substantially the height of the first wall, the first inner drywall layer being spaced apart from the first outer insulation layer, and
    a plurality of frame members that each extend substantially the height of the first wall, the frame members each comprising:
      a first outer stud adapted to have the first outer insulation layer affixed thereto,
      a first inner stud adapted to have the first inner drywall layer affixed thereto,
      a plurality of first spacers extending between the first outer stud and the first inner stud to interlock the first outer stud and the first inner stud together in a spaced apart relationship,
      the first inner stud comprising an inner flange extending substantially transverse to a length of the first spacers,
      the inner flange defining a first slot for slidably receiving the first inner drywall layer, and
      a cavity forming flange connected to the inner flange and located on a side of the inner flange away from the first outer stud, the cavity forming flange extending parallel to the inner flange and spaced apart from the inner flange to form a cavity therebetween to facilitate installation of conduits,
    wherein an opening is defined by the first spacers and the first outer and inner studs, with the opening being sized to permit flow of uncured concrete there through if the uncured concrete is poured between the first outer insulation layer affixed to the first outer studs and the first inner drywall layer affixed to the first inner studs, the frame members extending between the first outer insulation layer and the first inner drywall layer to interlock the first outer insulation layer and the first inner drywall layer together and maintain a space therebetween for receiving the uncured concrete to form a concrete core and, facilitated by the cavity forming flange, for defining the cavity for the conduits; and
  a plurality of second walls, each of the plurality of second walls comprising:
    a second outer insulation layer, a second inner drywall layer spaced apart from the second outer insulation layer, and a plurality of second frame members each extending between the second outer insulation layer and the second inner drywall layer to interlock the second insulation layer and the second drywall layer together and maintain a space therebetween for receiving uncured concrete to form a concrete core and/or for receiving the conduits,
  wherein, in at least some of the first and/or second walls, the first and/or second frame members, on a side nearest the first and/or second inner drywall layers, are free from thermal insulation to facilitate thermal energy transfer through the first and/or second inner drywall layer to and from the concrete core, such that the concrete core can act as a thermal battery to absorb, store and later slowly release thermal energy.

9. A building system according to claim 8, wherein each of the second walls comprises a top, a bottom, and a height that extends from the top to the bottom wherein the frame members of the second walls each extends substantially the height of the second walls and comprises:
  a pair of elongate, spaced apart, substantially parallel, second studs, and
  a plurality of second spacers interconnecting the pair of second studs,
  wherein the second studs comprise second outer studs for connection to the second outer insulation layer and second inner studs for connection to the second inner drywall layer.

10. A building system according to claim 9, wherein the spacers of the first and second walls comprise one or more of said first slot and a second slot for positioning reinforcement for concrete to be poured between the inner and outer layers of the first and second walls.

11. A building system according to claim 10, wherein the first and second slots comprise different lengths and/or different axial positions to facilitate a tailored arrangement of the reinforcement.

12. A building system according to claim 9, wherein the outer studs of the first and second walls each comprise an outer flange extending substantially parallel to a plane of the outer layer of the first and second walls.

13. A building system according to claim 12, wherein the outer insulation layer of the first and second walls comprise a plurality of second slots for slidably receiving the outer flanges of the outer studs of the frame members of the first walls and outer flanges of the outer studs of the frame members of the second walls, respectively, such that engagement of the outer flanges in the plurality of second slots of the outer insulation layers secures the outer insulation layer to the outer studs against relative movement in a direction perpendicular to a plane of the outer insulation layers.

14. A building system according to claim 9, wherein the inner studs of the second walls each comprise an inner flange extending substantially parallel to a plane of the second inner drywall layer.

15. A building system according to claim 14, wherein the inner flange of each of the inner studs of the second walls is slidably engageable in an elongate track member to facilitate connection of the second inner drywall layer to the inner flange of each of the inner studs of the second walls.

16. A building system according to claim 15, wherein the track member comprises a first substantially C-shaped channel in which the inner flange of each of the inner studs of the second walls is slidably engageable.

17. A building system according to claim 16, wherein the track member comprises a second substantially C-shaped channel, on a side of the first C-shaped channel remote from the inner layer of each of the inner studs of the second walls.

18. A building system according to claim 15, wherein the track member comprises a flat mounting surface for facilitating joining of drywall sheets to form the second inner drywall layer.

19. A building system according to claim 9, wherein each of the frame members of the first walls is formed from a plurality of first frame member modules that are joined together to form a first unitary frame member and wherein each of the frame members of the second walls is formed from a plurality of second frame member modules that are joined together to form a second unitary frame member.

20. A building system according to claim 19, wherein the frame member modules of the first and second walls have tongue and groove formations to facilitate being joined together.

21. A building system according to claim 9, wherein the inner studs of the second walls each comprise an inner flange defining a flat mounting surface for facilitating attaching of the second inner drywall layer.

22. A building system according to claim 21, wherein the inner drywall layer of the first and second walls is formed from a material that facilitates transfer of heat energy to and from the concrete core, the material being selected from the group consisting of: fibre cement sheets, magnesium oxide sheets and mineral based drywall materials.

23. A building system according to claim 9, wherein the studs and spacers of the frame members of the first walls are integrally formed in one-piece construction and wherein the studs and spacers of the frame members of the second walls are integrally formed in one-piece construction.

* * * * *